United States Patent
Winarski

(10) Patent No.: US 10,860,259 B1
(45) Date of Patent: Dec. 8, 2020

(54) MULTI-TIERED STORAGE SYSTEM FOR BLOCKCHAIN

(71) Applicant: Tyson York Winarski, Tempe, AZ (US)

(72) Inventor: Tyson York Winarski, Tempe, AZ (US)

( * ) Notice: Subject to any disclaimer, the term of this patent is extended or adjusted under 35 U.S.C. 154(b) by 0 days.

(21) Appl. No.: 16/543,598

(22) Filed: Aug. 18, 2019

Related U.S. Application Data

(60) Provisional application No. 62/875,074, filed on Jul. 17, 2019.

(51) Int. Cl.
| | |
|---|---|
| *G06F 3/06* | (2006.01) |
| *H04L 9/06* | (2006.01) |
| *G06F 5/06* | (2006.01) |
| *G06F 12/122* | (2016.01) |

(52) U.S. Cl.
CPC .......... *G06F 3/0685* (2013.01); *G06F 3/0614* (2013.01); *G06F 3/0647* (2013.01); *G06F 5/06* (2013.01); *G06F 12/122* (2013.01); *H04L 9/0637* (2013.01); *H04L 2209/38* (2013.01)

(58) Field of Classification Search
CPC .... G06F 3/0685; G06F 3/0614; G06F 3/0647; G06F 5/06; G06F 12/122; H04L 9/0637
See application file for complete search history.

(56) References Cited

U.S. PATENT DOCUMENTS

| | | | | |
|---|---|---|---|---|
| 2018/0323963 | A1* | 11/2018 | Stollman | H04L 9/3239 |
| 2019/0354489 | A1* | 11/2019 | Gupta | G06N 3/08 |

FOREIGN PATENT DOCUMENTS

| | | |
|---|---|---|
| CN | 109144414 | 1/2019 |
| WO | 2018232490 A1 | 12/2018 |

OTHER PUBLICATIONS

Web Application Hosting in the AWS Cloud, Amazon web services, Sep. 2017 (Year: 2017).*
Insight Chain Founding Team, Insight Chain Technical White Paper V1.0 A Data Ecosystem Public Blockchain with Infinite Scalability. Feb. 1, 2019. http://cdn.appweiyuan.com/insightchain/technical_whitepaper/insight_chain_technical_whitepaper_v1.0_en_US.pdf.

* cited by examiner

*Primary Examiner* — Ryan Bertram
*Assistant Examiner* — Edmund H Kwong
(74) *Attorney, Agent, or Firm* — The Winarski Firm, PLLC

(57) ABSTRACT

An archival blockchain system is disclosed that includes a cache-tier storage level where blockchain blocks for a contiguous blockchain are generated and stored before they have met a first aging criteria, a disk-tier storage level where the blockchain blocks are stored after they have met the first aging criteria, but before they have met a second aging criteria, and a tape-tier storage level where the blockchain blocks are stored after they have met the second aging criteria. This archival blockchain system also includes a blockchain appliance in digital data communication with the cache-tier, disk-tier, and tape-tier storage levels that maintains a blockchain ledger that stores data pointers to the blockchain blocks stored on the cache-tier, disk-tier, and tape-tier storage levels to logically link them into the contiguous blockchain.

20 Claims, 24 Drawing Sheets

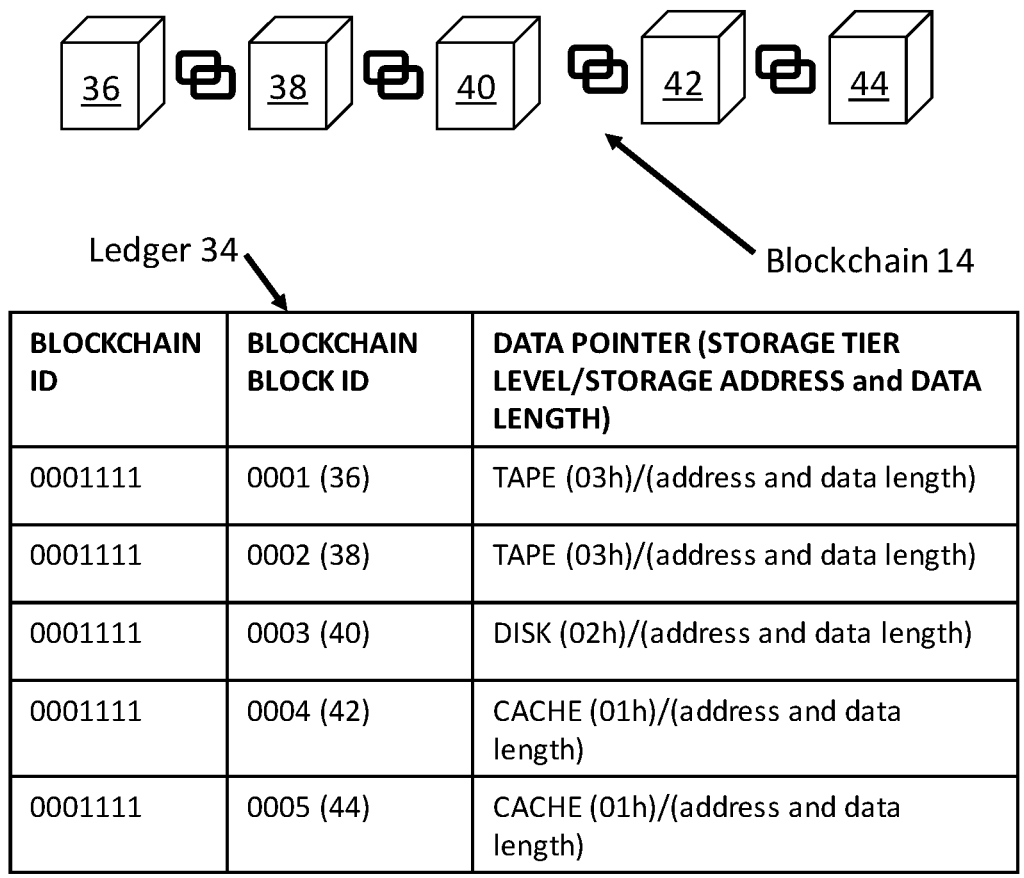
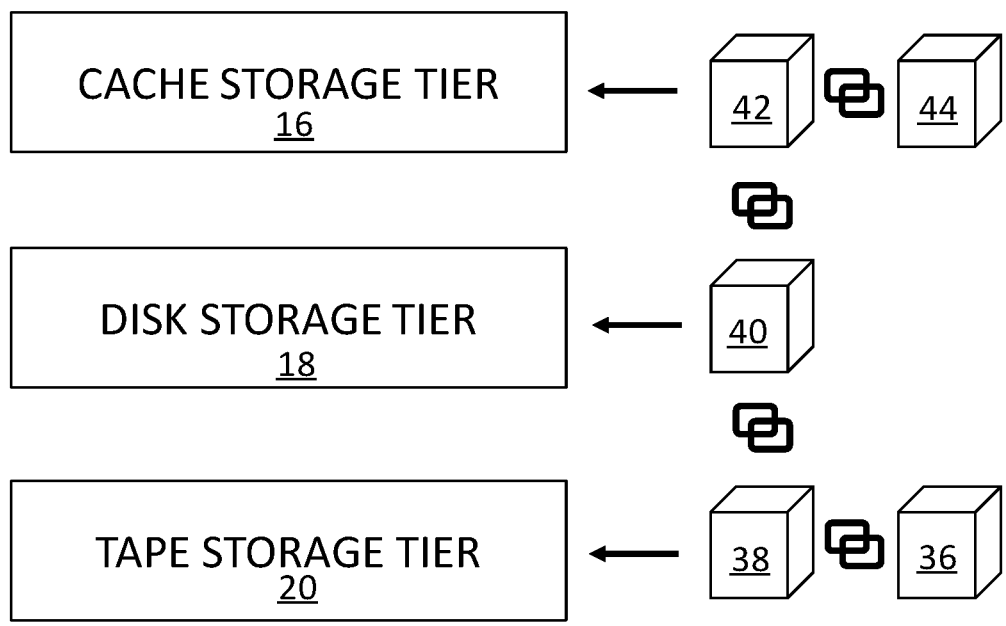
FIG. 2

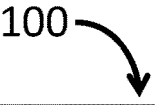

| Blockchain Block Bytes 101 | Description 102 |
|---|---|
| Byte 0-1 | 102A: Blockchain ID Number<br>102B: Blockchain Block ID Number |
| Byte 2-9 | 102C: Data Pointer<br>102D: Storage Tier Used<br>01h denotes Cache-tier    02h denotes Disk-tier<br>03h denotes Tape-tier    04h denotes Multi-tier<br>102E: Physical Address in Storage Tier and Data Length |
| Bytes 10-13 | 102F: Date Stamp (year, month, day YYYY:MM:DD) |
| Bytes 14-16 | 102G: Time Stamp (hours, minutes, seconds HH:mm:SS) |
| Byte 17: 0h-FFh<br>00h<br>01h<br>02h<br>03h<br>04h<br>05h<br>06h | 102H: Blockchain Hash Algorithm identifier:<br>SHA-224 algorithm identifier<br>SHA-256 algorithm identifier<br>SHA-384 algorithm identifier<br>SHA-512 algorithm identifier<br>SHA-512/224 algorithm identifier<br>SHA-512/256 algorithm identifier<br>MD5 algorithm identifier |
| Bytes 18...<br>Bytes 18-45<br>Bytes 18-49<br>Bytes 18-65<br>Bytes 18-81<br>Bytes 18-33 | 102I: Blockchain HASH digest:<br>SHA-224 and SHA-512/224 digests (224 bits or 28-Bytes)<br>SHA-256 and SHA-512/256 digests (256 bits or 32-Bytes)<br>SHA-384 digest (384 bits or 48-Bytes)<br>SHA-512 digest (512 bits or 64-Bytes)<br>MD-5 digest    (128 bits or 16-Bytes) |
| Byte 46<br>Byte 50<br>Byte 66<br>Byte 82<br>Byte 34 | 102J: Logical-End-of-Blockchain-Block Byte:<br>       BC(h) (1011 1100)<br>For SHA-224 and SHA-512/224 blockchain digests<br>For SHA-256 and SHA-512/256 blockchain digests<br>For SHA-384 blockchain digest<br>For SHA-512 blockchain digest<br>For MD-5 blockchain digest |

FIG. 3

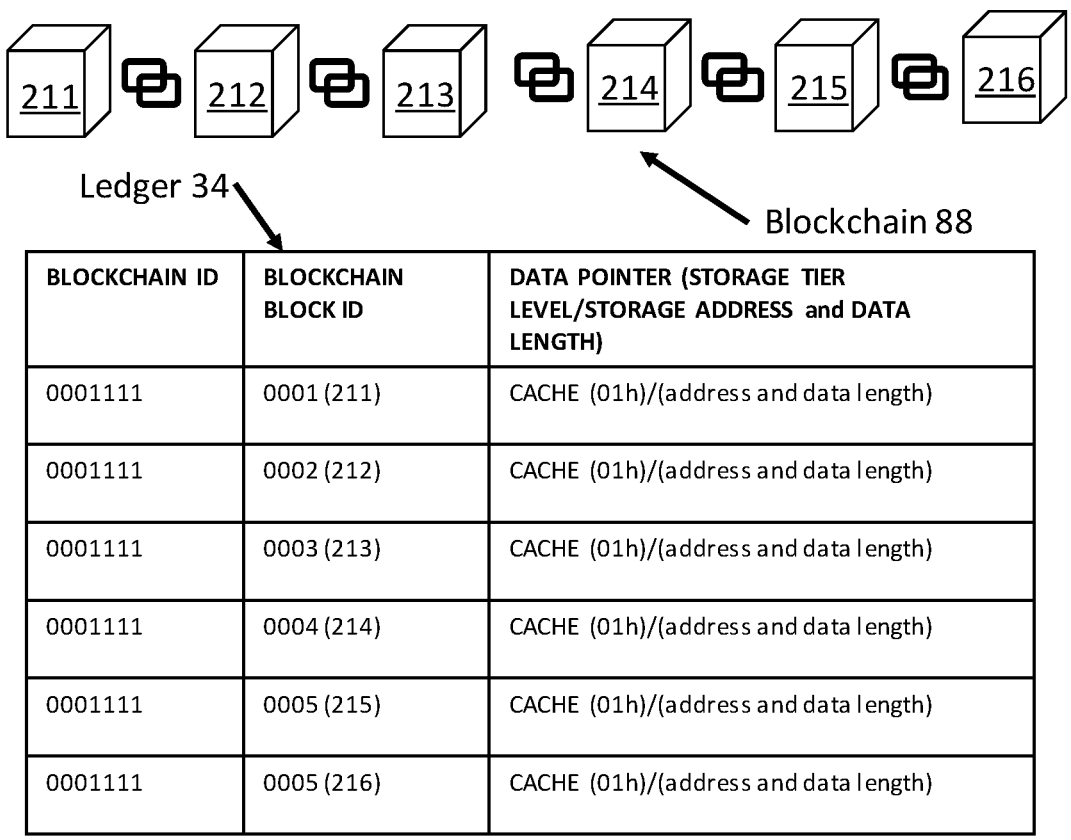
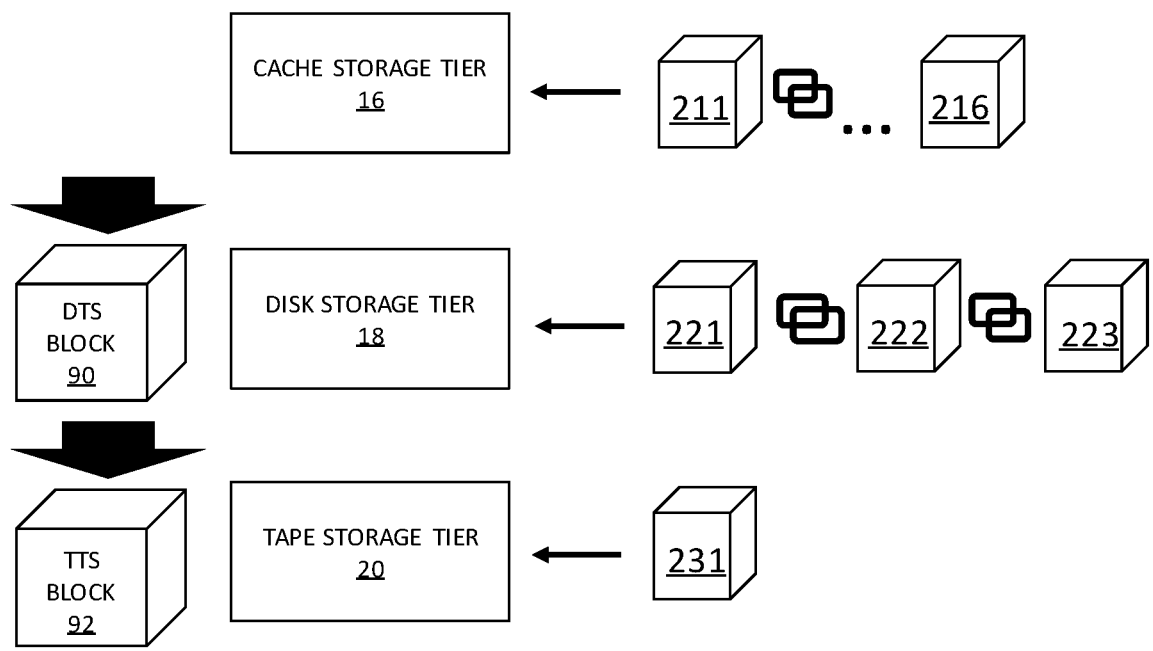
FIG. 9

| C-Block ID 240 | C-Block with Blockchain HASH Digest Appended to Cached Object. Cache Data-Pointer to Grouped-Object 241 |
|---|---|
| 211C | *Blockchain HASH Digest in C-Block 211C is hash of object 211B, as calculated by hash core 404, as it is the genesis block. <br> *Cache data–pointer to grouped object 211B-211C, which is blockchain block 211, in stored in ledger 34. |
| 212C | *Blockchain HASH Digest in C-Block 212C is hash of object 212B and blockchain block 211, as calculated by hash core 404. <br> *Cache data–pointer to grouped object 212B-212C, which is blockchain block 212, in stored in ledger. |
| 213C | *Blockchain HASH Digest in C-Block 213C is hash of object 213B and blockchain block 212, as calculated by hash core 404. <br> *Cache data–pointer to grouped object 213-213C, which is blockchain block 213, in stored in ledger. |
| 214C | *Blockchain HASH Digest in C-Block 214C is hash of object 214B and blockchain block 213, as calculated by hash core 404. <br> *Cache data–pointer to grouped object 214B-214C, which is blockchain block 214, in stored in ledger. |
| 215C | *Blockchain HASH Digest in C-Block 215C is hash of object 215B and blockchain block 214, as calculated by hash core 404. <br> *Cache data–pointer to grouped object 215B-215C, which is blockchain block 215, in stored in ledger. |
| 216C | *Blockchain HASH Digest in C-Block 216C is hash of object 216B and blockchain block 215, as calculated by hash core 404. <br> *Cache data–pointer to grouped object 216B-216C, which is blockchain block 216, in stored in ledger. |

FIG. 11B

| D-Block ID 242 | D-Block with Blockchain HASH Digest Appended to Grouped Object. Disk Data-Pointer to Grouped-Object. 243 |
|---|---|
| 221D | *Blockchain HASH Digest in D-Block 221D is the hash of grouped objects 211B-211C and 212B-212C as it is the genesis block of the archival DTS blockchain, as calculated by hash core 404.<br>*Disk data–pointer to grouped object 211B-211C-212B-212C-221D, which is archival DTS blockchain block 221, stored in ledger. |
| 222D | *Blockchain HASH Digest in D-Block 222D is the hash of grouped objects 213B-213C and 214B-214C and blockchain block 221, as calculated by hash core 404.<br>*Disk data–pointer to grouped object 213B-213C-214B-214C-222D, which is archival DTS blockchain block 222, stored in ledger. |
| 223D | *Blockchain HASH Digest in D-Block 223D is the hash of grouped objects 215B-215C and 216B-216C and blockchain block 222, as calculated by hash core 404.<br>*Disk data–pointer to grouped object 215B-215C-216B-216C-223D, which is archival DTS blockchain block 223, stored in ledger. |

| T-Block ID 244 | T-Block with Blockchain HASH Digest Appended to Grouped Object. Tape Data-Pointer to Grouped-Object. 245 |
|---|---|
| 231T | *Blockchain HASH Digest in T-Block 231T is the hash of grouped objects 211B-211C-212B-212C-221D, 213B-213C-214B-214C-222D, and 215B-215C-216B-216C-223D as it is the genesis block of the archival TTS blockchain, as calculated by hash core 404.<br>*Tape data–pointer to grouped object 211B-211C-212B-212C-221D-213B-213C-214B-214C-222D-215B-215C-216B-216C-223D-231T, which is archival TTS blockchain block 231, stored in ledger. |

FIG. 11C

Blockchain Blocks at Cache Tier      DTS Archival Blocks at Disk Tier      TTS Archival Blocks at Tape Tier

| C-Block ID 240 | C-Block with Blockchain HASH Digest Appended to Cached Object. Cache Data-Pointer to Grouped-Object 241 |
|---|---|
| 219C | *Blockchain HASH Digest in C-Block 219C is hash of object 219 and blockchain block 218, as calculated by a hash core 404.<br>*Cache data–pointer to grouped object 219-219C in ledger. |

| D-Block ID 242 | D-Block with Blockchain HASH Digest Appended to Grouped Object. Disk Data-Pointer to Grouped-Object. 243 |
|---|---|
| 224D | *Blockchain HASH Digest in D-Block 224D is the hash of blockchain blocks 217 and 218 and blockchain block 223, as calculated by a hash core such as hash core 404.<br>*Disk data–pointer to blockchain block 224 stored in ledger. |

| T-Block ID 244 | T-Block with Blockchain HASH Digest Appended to Grouped Object. Tape Data-Pointer to Grouped-Object. 245 |
|---|---|
| 231T | *Blockchain HASH Digest in T-Block 231T is the hash 211B-211C-212B-212C-221D, 213B-213C-214B-214C-222D, and 215B-215C-216B-216C-223D, as calculated by hash core 404.<br>*Tape data–pointer to blockchain block 231 stored in ledger. |

| M-Block ID 246 | M-Block with Blockchain HASH Digest Logically Appended to Multi-Tier Grouped Object. Multi-Tier Data-Pointers to Tape, Disk, and Cache Grouped-Objects. 247 |
|---|---|
| 1040M | *Blockchain HASH Digest in M-Block 1040M is the hash of blockchain blocks 231, 224, and 219 as calculated by a hash core such as hash core 404.<br>*Multi-tier data–pointers to multi-tier blockchain block 1040 stored in ledger. |

FIG. 11F

MULTI-TIERED STORAGE SYSTEM FOR BLOCKCHAIN

FIELD OF THE DISCLOSURE

The present specification concerns the field of blockchain technology. More particularly, this present specification addresses the idea of storing blockchain technology across a multi-tiered storage system having a storage hierarchy formed of a cache-tier, a disk-tier, and an archival tape-tier. The present specification provides two distinct technological solutions for implementing a multi-tiered storage system for blockchain technology addressing various engineering and software challenges facing the integration of these disparate technologies using storage tier maps stored in ledgers and secondary archival blockchains.

BACKGROUND OF THE DISCLOSURE

The present specification concerns blockchain technology and a multi-tiered storage system. Blockchain technology is finding increasing use for insuring the error-free transfer of information. A hash algorithm takes input and converts it to, at a very high probability, a unique series of digits called a blockchain hash digest. The more digits in this blockchain hash digest, the less likely that there would be a collision, where different input had the same blockchain hash digest. The blockchain hash function demonstrates the avalanche effect, where a tiny change in the input, no matter how small, creates a significant change to the output digest. Since this specification improves upon the Merkle Tree, we incorporate U.S. Pat. No. 4,309,569 by reference in its entirety. This blockchain technology may be employed to big data, where there may be thousands, millions, and even billions of data objects to blockchain. Millions and billions of data objects may occur in digital movies, where each data object comprises I, P, and B frames organized in what is called a group of pictures (GOP). Merkle B-Trees may be used as a blockchain structure for such large numbers of data objects to enable them to be blockchained together. This blockchain technology may also apply to cryptocurrency transactions, images such as *.jpg and *.png, to messages sent across networks, medical records, financial records, data transactions, large, multi-dimensional spreadsheets, and all other data records and transactions. Blockchain technology is a data intensive record solution that requires a substantial amount of memory. The large amounts of memory required by blockchain technology can overwhelm the cache memory resources of network nodes where blockchains are generated and stored for verification. There is therefore a need for managing the memory storage allocation for blockchain technology. Multi-tiered storage systems commonly involve a cache-tier, disk-tier, and archival tape-tier. The cache-tier may employ flash memory in the form of NAND and NOR memory, either as chips or in the form of solid-state drives (SSD). The disk-tier includes hard disk drives, the performance of which depends on the disk-to-CPU interface, the recording density, the seek time, and the RPM of the disk itself. The archival tape-tier includes tape drives using single-reel tape cartridges, such as the Linear Tape Open (LTO) Ultrium tape cartridge. This tape drive may be contained within a robotic library that uses automation to service tape cartridges between library storage slots and tape drives. This specification melds Blockchain hash technology with storage specifications, to provide a standards-compatible implementation, such as compatibility with *ECMA*-319 *12.7 mm—384-Track Magnetic Tape Cartridges—Ultrium*-1 *Format* (June 2001), and *ISO/IEC* 22050:2002 *Information technology—Data interchange on* 12.7 *mm,* 384-*track magnetic tape cartridges—Ultrium*-1 *format*, both of which are hereby incorporated by reference in their entirety.

SUMMARY OF THE DISCLOSURE

The present disclosure provides for a method of generating and storing blockchains within a multi-tiered storage system. This method includes generating blockchain blocks of a contiguous blockchain within a cache-tier storage level and storing the blockchain blocks within a cache-tier storage level for a period of network distribution and verification. Then the method bundles a group of the blockchain blocks stored in the cache-tier level that have reached a first blockchain block aging criteria for storage within a disk-tier storage level. Next the method bundles multiple groups of the blockchain blocks stored in the disk-tier storage level that have reached a second blockchain block aging criteria into a set for storage in a tape-tier storage level. The method may also maintain a ledger containing data pointers to the blockchain blocks stored across the cache-tier, the disk-tier, and the tape-tier storage levels logically linking them together into the contiguous blockchain. The first and second blockchain block aging criteria may include a Least-Recently-Used (LRU) access threshold, a Time-Aware Least-Recently Used (TALRU) access threshold, an Adaptive Replacement Cache (ARC) access threshold, a Least-Frequently-Used (LFU) access threshold, a First-In First-Out (FIFO) access threshold, and an age threshold. The method may also update the ledger with new data pointers when several blockchain blocks stored on the cache-tier level are bundled into the group and migrated to the disk-tier storage level, and update the ledger with new data pointers when several groups of the blockchain blocks stored on the disk-tier level are bundled into the set and migrated to the tape-tier storage level. This method may use a blockchain archival appliance that interrogates the blockchain blocks stored in the cache-tier storage level with respect to the first aging criteria and selects those blockchain blocks that meet the first aging criteria for bundling into the group for migration to the disk-tier storage level when the cache-tier storage level has its capacity filed to a first threshold level. The blockchain archival appliance may also interrogate the groups of the blockchain blocks stored in the disk-tier storage level with respect to the second aging criteria for bundling into the set for migration to the tape-tier storage level when the disk-tier storage level has its capacity filed to a second threshold level. The first threshold level may be greater than 60% of the storage capacity of the cache-tier storage level. The second threshold level may be greater than 60% of the storage capacity of the disk-tier storage level. The blockchain archival appliance may also generate data pointers to the blockchain blocks stored in the cache-tier, disk-tier, and tape-tier storage levels and stores them within the ledger to link the blockchain blocks across the cache-tier, disk-tier, and tape-tier storage levels into the contiguous blockchain. This method may also include deleting blockchain blocks from the cache-tier storage level after they have been bundled into the group and migrated to the disk-tier storage level and deleting groups of blockchain blocks from the disk-tier storage level after they have been bundled into the set and migrated to the tape-tier storage level. In a typical network embodiment, the cache-tier storage level has more storage nodes than the disk-tier storage level, the disk-tier storage level has more storage nodes than the tape-tier storage level, and the tape-tier storage level is located at a geographically remote disaster data recovery facility. Each blockchain block within the cache-tier storage level are blockchained together with cache-level blockchains. Groups of blockchain blocks stored within the disk-tier storage level are secured together with disk-tier blockchains. Sets of blockchain blocks stored within the tape-tier storage level are secured together with tape-tier storage blockchains. The contiguous blockchain in this embodiment may take the form of a Merkle Tree where the blockchain blocks stored on the tape-tier storage level forms a root level node in the Merkle Tree, the blockchain blocks stored on the disk-tier storage level forms mid-level nodes in the Merkle Tree, and the blockchain blocks stored on cache-tier storage level forms leaf-level nodes in the Merkle Tree. A multi-tiered blockchain block logically links the blockchain blocks stored on the cache-tier storage level, the disk-tier storage level, and the tape-tier storage level together into the contiguous blockchain. The multi-tiered blockchain block bundles all of the blocks of the contiguous blockchain stored across cache-tier storage level, the disk-tier storage level, and the tape-tier storage level the into a single blockchain block. The multi-tiered blockchain block is formed using the ledger when there is a read request for the contiguous blockchain. Multiple sequential read requests generate multiple sequential multi-tiered blockchain blocks that form a multi-tiered blockchain. The multi-tiered blockchain records an access history of the contiguous blockchain including the varying storage locations of the contiguous blockchain during the access history This method may include wrapping the contiguous blockchain with a metadata wrapper that includes the ledger.

The present specification also discloses an archival blockchain system. This archival blockchain system includes a cache-tier storage level where blockchain blocks for a contiguous blockchain are generated and stored before they have met a first aging criteria, a disk-tier storage level where the blockchain blocks are stored after they have met the first aging criteria, but before they have met a second aging criteria, and a tape-tier storage level where the blockchain blocks are stored after they have met the second aging criteria. This archival blockchain system also includes a blockchain appliance in digital data communication with the cache-tier, disk-tier, and tape-tier storage levels that maintains a blockchain ledger that stores data pointers to the blockchain blocks stored on the cache-tier, disk-tier, and tape-tier storage levels to logically link them into the contiguous blockchain. The blockchain appliance interrogates the blockchain blocks stored in the cache-tier storage level with respect to the first aging criteria and selects those blockchain blocks that meet the first aging criteria for migration to the disk-tier storage level when the cache-tier storage level has its capacity filed to a first threshold level. The blockchain archival appliance also interrogates the blockchain blocks stored in the disk-tier storage level with respect to the second aging criteria for migration to the tape-tier storage level when the disk-tier storage level has its capacity filed to a second threshold level. The first threshold level may be greater than 60% of the storage capacity of the cache-tier storage level and the second threshold level may be greater than 60% of the storage capacity of the disk-tier storage level. The first and second blockchain block aging criteria may include a Least-Recently-Used (LRU) access threshold, a Time-Aware Least-Recently Used (TALRU) access threshold, an Adaptive Replacement Cache (ARC) access threshold, a Least-Frequently-Used (LFU) access threshold, a First-In First-Out (FIFO) access threshold, and an age threshold. The blockchain appliance blockchain appliance updates the ledger with new data pointers when blockchain blocks stored on the cache-tier level are migrated to the disk-tier storage level. The blockchain appliance also updates the ledger with new data pointers when blockchain blocks stored on the disk-tier level are migrated to the tape-tier storage level. The blockchain appliance deletes blockchain blocks from the cache-tier storage level after they have been migrated to the disk-tier storage level. The blockchain appliance also deletes blockchain blocks from the disk-tier storage level after they have been migrated to the tape-tier storage level. The contiguous blockchain may take the form of a Merkle Tree, wherein the blockchain blocks stored on the tape-tier storage level forms a root level node in the Merkle Tree, the blockchain blocks stored on the disk-tier storage level forms mid-level nodes in the Merkle Tree, and the blockchain blocks stored on cache-tier storage level forms leaf-level nodes in the Merkle Tree. The blockchain blocks stored on the cache-tier storage level, the disk-tier storage level, and the tape-tier storage level are logically linked together to form the contiguous blockchain by a multi-tiered blockchain block.

The present specification also discloses a multi-tiered archival blockchain storage system that includes a cache-tier storage level where blockchain blocks for a contiguous blockchain are initially stored before they have met a first aging criteria, a disk-tier storage level where the blockchain blocks are migrated to for storage from the cache-tier storage level after they have met the first aging criteria, and a tape-tier storage level where the blockchain blocks are migrated to for storage from the disk-tier storage level after application of a second aging criteria. The system also includes an archival blockchain block that wraps the blockchain blocks when they are being migrated for storage to the disk-tier storage level, or the tape-tier storage level. An instance of blockchain blocks being migrated to the disk-tier storage level, or the tape-tier storage level generates the archival blockchain block. The archival blockchain block contains those blockchain blocks from the contiguous blockchain that are being migrated as data. Multiple migration events generate multiple archival blockchain blocks that form an archival blockchain. Migration events from the cache-tier storage level to the disk-tier storage level generate archival disk-tier storage blocks. Migration events from the disk-tier storage level to the tape-tier storage level generate archival tape-tier storage blocks. The second aging criteria is applied to the archival disk-tier storage blocks. The archival tape-tier storage block wraps one or more of the disk-tier archival storage blocks selected for migration to the tape-tier storage level based on the second aging criteria. The archival blockchain has the form of a Merkle B-tree. The archival tape-tier blockchain blocks form root level nodes in the Merkle B-tree. The archival disk-tier blockchain blocks form mid-level nodes in the Merkle B-tree. The blockchain blocks stored on cache-tier storage level forms leaf-level nodes in the Merkle B-tree. The first and second aging criteria may be a Least-Recently-Used (LRU) access threshold, a Time-Aware Least-Recently Used (TALRU) access threshold, an Adaptive Replacement Cache (ARC) access threshold, a Least-Frequently-Used (LFU) access threshold, a First-In First-Out (FIFO) access threshold, or an age threshold. Further aspects of the invention will become apparent as the following description proceeds and the features of novelty, which characterize this invention, are pointed out with particularity in the claims annexed to and forming a part of this specification.

BRIEF DESCRIPTION OF THE DRAWINGS

The novel features that are considered characteristic of the invention are set forth with particularity in the appended claims. The invention itself, however, both as to its structure and operation together with the additional objects and advantages thereof are best understood through the following description of the preferred embodiment of the present invention when read in conjunction with the accompanying drawings, wherein:

FIG. 2 illustrates a blockchain stored across a multi-tiered storage system with a ledger maintained by the blockchain appliance that tracks the location of blockchain blocks across the various storage tiers;

FIG. 3 illustrates a table describing the information contained within a blockchain block according to the present specification for implementation across a multi-tiered storage system;

FIG. 9 illustrates a blockchain stored across a multi-tiered storage system with a ledger maintained by the blockchain appliance that tracks the location of blockchain blocks across the various storage tiers where a secondary archival blockchain secures blockchain blocks as they are migrated from the cache storage tier to the disk storage tier and the tape storage tier;

FIGS. 11A-11F depict a blockchain that has been stored on a multi-tiered storage system where a secondary archival blockchain wraps and secures blockchain blocks as they are moved from the cache storage tier to the disk storage tier and the tape storage tier;

FIG. 11A illustrates a block diagram of a blockchain stored across a multi-tiered storage system where a secondary archival blockchain wraps and secures blockchain blocks as they are moved from the cache storage tier to the disk storage tier and the tape storage tier;

FIG. 11B depicts a table describing the information contained within each of the blockchain blocks associated with data objects within the cache storage tier;

FIG. 11C depicts tables describing the information contained within each of the blockchain blocks associated with data objects within the disk storage tier and tape storage tier;

FIG. 11D illustrates how blockchains are configured into archival Merkle B-Trees for data storage across a multi-tiered storage system that includes cache, disk, and tape storage tiers;

FIG. 11E illustrates a block diagram of a blockchain stored across a multi-tiered storage system where the blockchain blocks are logically linked into a contiguous blockchain through a multi-tiered blockchain block that contains the blockchain blocks of the entire contiguous blockchain and its associated archival blockchain;

FIG. 11F illustrates a series of tables describing the information contained within each of the blockchain blocks associated with data objects within the cache, disk, and tape storage tiers along with the multi-tiered blockchain block that logically links all of the blocks together into a contiguous blockchain archived on a multi-tiered storage system;

DETAILED DESCRIPTION

Figure 1:
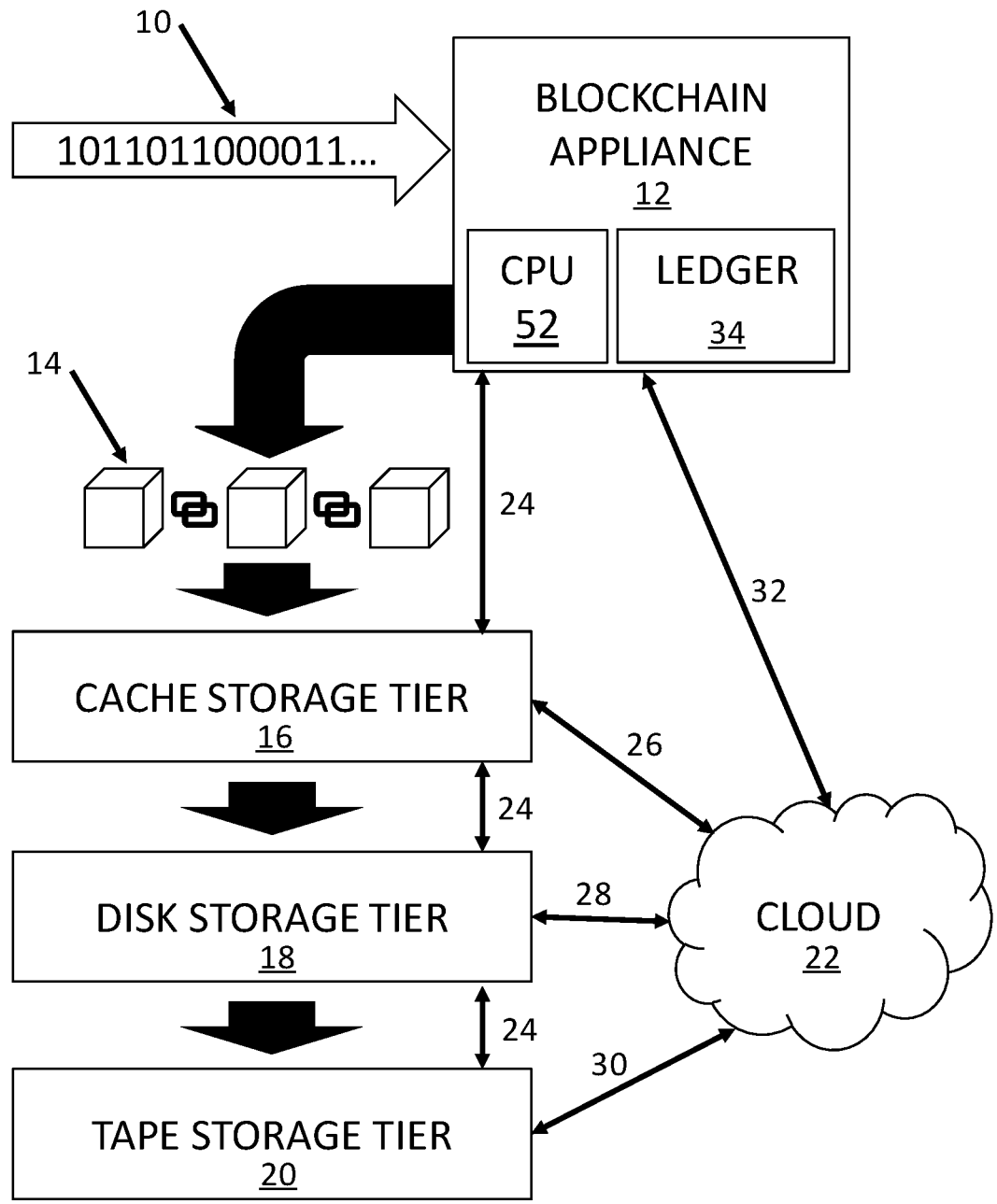
FIG. 1 illustrates a schematic diagram illustrating a blockchain appliance that receives a data stream that is structured into a blockchain technology for storage on a multi-tiered storage system.

While the invention has been shown and described with reference to a particular embodiment thereof, it will be understood to those skilled in the art, that various changes in form and details may be made therein without departing from the spirit and scope of the invention. FIG. 1 illustrates a schematic diagram illustrating a blockchain appliance 12 that receives a data stream 10 that is structured into a blockchain technology 14 for storage on a multi-tiered storage system that includes a cache storage tier 16, a disk storage tier 18, and a tape storage tier 20. Blockchain appliance includes a CPU 52 and a ledger 34. Ledger 34 tracks the storage locations of the blockchain blocks that form blockchain 14 as they are stored and migrated across various tiers of the multi-tiered storage system in order to allow blockchain appliance 12 to locate and access each and every blockchain block within blockchain 14 and reassemble all of the individual blocks logically into blockchain 14. CPU 52 provides all necessary computational needs for blockchain appliance 12 in receiving data stream 10 and configuring it into blockchain 14 for storage on the multi-tiered storage system formed of the cache 16, disk 18, and tape 20 storage levels. Ledger 34 includes a table listing of all of the blockchain blocks that form blockchain 14 as well as the storage tier upon which they are stored, the address on the storage tier at which they are stored, as well as the length of the blockchain block in the form of a data pointer. Blockchain appliance 12 gathers this data pointer information as blockchain blocks are stored and migrated around the multi-tiered storage system and records it in the ledger 34 to form a "map" logically maintain blockchain 14 in a contiguous manner. Blockchain appliance 12 is in bidirectional communication with cache storage tier 16, disk storage tier 18, and tape storage tier 20 either directly through communication link 24 or through bidirectional communication links 26, 28, 30 and 32 through a distributed network like cloud 22 or an Internet. Data stream 10 may be any form of data, such as financial records, medical records, tax records, business records, multi-dimensional spreadsheets, video streams, audio streams, software streams, data streams, or any other form of digital data or information. The data stream 10 is shown representationally through a directional arrow containing information in binary format. Blockchain appliance 12 is configured to receive data stream 10 directly or through another node in a distributed network in communication with blockchain appliance 12. CPU 52 takes data stream 10 and converts it into a series of blockchain blocks forming blockchain 14. The distributed network nodes that receive data stream 10 or blockchain appliance 12 are generally at least equipped with cache storage 16 for storing blockchain blocks within blockchain 14 as they are created by blockchain appliance 12. Blockchain 14 with its associated data and hash digests may include an exceedingly large amount of data, particularly with respect to big-data applications. Memory within cache storage tier 16, disk storage tier 18, and tape storage tier 20 is finite and limited. In order to continue to generate blockchain 14 and ensure an efficient storage and access of blockchain 14, blockchain appliance 12 must monitor and manage the available memory in cache 16, disk 18, and tape 20. For example, with time, the available memory in cache 16 for storage of blockchain 14 will decrease as appliance 12 fills cache 16 with blockchain information. It therefore becomes desirable to relocate some blockchain information stored within cache 16 to disk storage tier 18 and tape storage tier 20 based on certain decision criteria. These decision criteria include, but are not limited to, include a Least-Recently-Used (LRU) access threshold, a Time-Aware Least-Recently Used (TALRU) access threshold, an Adaptive Replacement Cache (ARC) access threshold, a Least-Frequently-Used (LFU) access threshold, a First-In First-Out (FIFO) access threshold, and an age threshold. Once blockchain appliance 12 determines that cache storage tier 16 has been filled with data to a certain threshold, blockchain appliance will then apply one of the above decision criteria to select one or more blockchain blocks to move out of cache storage tier 16 up into disk storage tier 18. Disk storage tier 18 has its own storage memory limits. With time, disk storage tier 18 will fill up with data as more and more blockchain blocks of blockchain 14 are stored on disk storage tier 20. Blockchain appliance 12 monitors disk storage tier 18 to determine whether a memory storage threshold has been crossed with respect to how much of disk storage tier 18 is filled with data. Once that memory storage threshold has been reached, blockchain appliance 12 applies a secondary selection criteria to the blockchain blocks stored in disk-tier 18 to determine which one or more blockchain blocks stored in disk storage tier 18 may be moved to tape storage tier 20. When blockchain blocks stored on cache storage tier 16 are migrated to disk storage tier 18, those blockchain blocks are deleted from cache storage tier 16. When blockchain blocks stored on disk storage tier 18 are migrated to tape storage tier 20 they are deleted from disk storage tier 20. Blockchain appliance 12 ascertains the storage capacities of cache 16, disk 18, and tape 20 and migrates blockchain 14 for storage across them accordingly. Practical costs and technological aspects of cache 16, disk 18, and tape 20 dictate how much memory is available to blockchain appliance 12. Cache 16 typically has the fastest read write access making it desirable for use in combination with creating new blockchains and accessing frequently accessed blockchains for reading and verification. However, cache 16 tends to be expensive and as such, limited amounts of cache are provided for each node within a distributed network. Disk storage tier 18 generally provides larger storage capacities than cache 16 at the cost of lower access times. Disk storage tier 18 is therefore desirable to store older blockchains 14 that are accessed less frequently than those stored within cache 16. As blockchains 14 age, they must be maintained in storage for future access, but those access events may prove rare. It is therefore desirable to maintain archival data storage of older blockchains 14 that are infrequently accessed on tape storage tier 20. Magnetic tape 20 has the lowest cost of data retention as well as the longest storage time when compared to cache 16 or disk 18. However, these technological benefits come at the cost of longer latency in accessing the data from tape 20. As such, smart distribution of blockchain blocks from blockchain 14 across the multi-tier storage system formed of cache 16, disk 18, and tape 20 can provide for a large amount of storage capacity for blockchains 14 with intelligent use of storage capabilities based on the different types of memory storage accounting for the age, size, and access frequency with which blockchain appliance 12 has to access the blockchain blocks from blockchain 14. As blockchain blocks from blockchain 14 are distributed across different devices on the multi-tier storage system, blockchain appliance 12 uses ledger 34 to record data pointers in order to logically link all the blockchain blocks back into contiguous blockchain 14. In this way, ledger 34 always keeps a "map" to the entire blockchain 14 through the data pointers. When blockchain appliance 12 receives data stream 10, it creates individual blockchain blocks that form blockchain 14. While appliance 12 is shown generating one blockchain 14 from one data stream 10, it is conceived that appliance 12 may generate any number of blockchains 14 from any number of data streams 10.

FIG. 2 illustrates a blockchain 14 stored across a multi-tiered storage system with a ledger 34 maintained by the blockchain appliance 12 that tracks the storage location of blockchain blocks 36, 38, 40, 42, and 44 across the various storage tiers 16, 18 and 20. Blockchain 14, in this exemplary depiction, is formed of five blockchain blocks 36, 38, 40, 42, and 44. Blockchain block 36 is the genesis block, and hence the oldest block in blockchain 14. Blockchain blocks 42 and 44 are the newest blockchain blocks in blockchain 14. Blockchain blocks 36, 38, 40, 42, and 44 were created by blockchain appliance 12 from data stream 10. When blockchain blocks 36, 38, 40, 42, and 44 were created, they were all initially stored on cache-tier level 16. As the cache-tier and disk-tier got filled up with data past a specified threshold, blockchain appliance 12 migrated the oldest blockchain blocks 36 and 38 up through disk-tier 18 to tape storage tier 20. The middle aged blockchain block 40 is stored on disk storage tier 18. The newest blockchain blocks are held within cache storage tier 16 until such time that the memory threshold set for cache storage tier 16 is reached. As such, contiguous blockchain 14 is not contiguously stored within a single memory storage device. Contiguous blockchain 14 is stored across multiple memory storage devices across multiple storage tiers 16, 18, and 20. In order to track the storage location of blockchain blocks 36, 38, 40, 42, and 44, blockchain appliance 12 generates data pointers indicating the storage tier at which each blockchain block is stored, the storage address within that storage tier at which each blockchain block is stored, as well as the data length of the blockchain block. Blockchain appliance generates and updates these data pointers and stores them within ledger 34. One depiction of ledger 34 is shown in FIG. 2. Ledger 34 is shown having three exemplary columns. Blockchain 14 has a unique identifier for the entire blockchain including all of its blockchain blocks 36, 38, 40, 42, and 44. The first column of ledger 34 includes this identification of blockchain 14. Each block 36, 38, 40, 42, and 44 within blockchain 14 has its own unique identifier. The second column includes a listing of these unique identifiers for each of the individual blockchain blocks 36, 38, 40, 42, and 44. The final column in ledger 34 provides a listing of the data pointer for each individual blockchain block 36, 38, 40, 42, and 44 within blockchain 14. The data pointer provides a specific storage location within multi-tiered storage system 16, 18, and 20. The data pointer includes a listing of the storage tier level 16, 18, or 20 at which the blockchain block 36, 38, 40, 42, or 44 is stored. The data pointer also includes the storage address within the device in that storage tier 36, 38, 40, 42, or 4 is stored. The data pointer also includes a listing of the data length of that blockchain block 36, 38, 40, 42, or 44 has at that storage location. FIG. 2 provides the primary embodiment of the archival storage system for blockchain 14 as disclosed in this specification.

FIG. 3 illustrates a table 100 describing the information contained within a blockchain block 36, 38, 40, 42, or 44 forming blockchain 44 according to the present specification for implementation across a multi-tiered storage system 16, 18, and 20. Table 100 serves as a metadata blockchain wrapper for the blockchain hash digest and data object(s) that are secured by the blockchain. In column 101 are the bytes used in the Blockchain Block and column 102 gives the description. Bytes 0-1 101A gives the unique identification number for the blockchain 14 as well as the unique identification number 101B for the individual blockchain blocks 36, 38, 40, 42, and 44. Bytes 2-9 store information for the data pointer 102C. The information for the data pointer, as discussed in FIG. 2 with respect to ledger 34, includes the storage tier used 102D: with 01h (hex) denoting the cache-tier 16, 02h denoting the disk-tier 18, 03h denoting the tape-tier 20, and 04h denoting multi-tier, for data spanning across multiple storage tiers such as cache 16, disk 18, and tape 20. Bytes 2-9 also include the physical address of the blockchain block in the storage tier and data length (102E). Bytes 10-14 (102F) are a date stamp comprising year, month, and day in the form YYYY:MM:DD. Bytes 14-16 are a time stamp (102G), comprising hours, minutes, and seconds in the form HH:mm:SS. In one embodiment, the hours, minutes, and seconds are in Greenwich Mean Time. In an alternate embodiment, two bytes could be added to denote the local time zone of the time stamp. In an alternate embodiment, additional bytes could be used to denote fractions of seconds, especially for objects stored in cache. Byte 17 (102H) defines the hash algorithm used by blockchain appliance 12 to generate blockchain blocks 36, 38, 40, 42, and 44. For example, the SHA-224 algorithm identifier is ooh, the SHA-256 algorithm identifier is 01h, the SHA-384 algorithm identifier is 02h, the SHA-512 algorithm identifier is 03h, the SHA-512/224 algorithm identifier is 04h, the SHA-512/256 algorithm identifier is 05h, and the MD5 algorithm identifier is 06h. Beginning with Byte-18 (1024 the actual blockchain hash digest is enclosed. For example, for SHA-224 and SHA-512/224 digests (224 bits or 28-Bytes) use Bytes 18-45 (when Byte-8 equals 00h or 04h), SHA-256 and SHA-512/256 digests (256 bits or 32-Bytes) use Bytes 18-49 (when Byte-8 equals 01h or 05h), SHA-384 digest (384 bits or 48-Bytes) uses Bytes 18-65 (when Byte-8 equals 02h), SHA-512 digest (512 bits or 64-Bytes) uses Bytes 18-81 (when Byte-8 equals 03h), and MD-5 digest (128 bits or 16-Bytes) uses Bytes 18-33 (when Byte-8 equals 06h). These digests may be calculated by hash core 404. A Logical-End-of-B-Block Byte (102J) may follow the above information. An exemplary Logical-End-of-B-block Byte is the hexadecimal number "BC" (1011 1100), where "BC" denotes blockchain. This logical-end-of-T-block is in byte 37 for SHA-224 and SHA-512/224 (when Byte-8=00h or 04h), byte 41 for SHA-256 and SHA-512/256 (when Byte-8=01h or 05h), byte 57 for SHA-384 digest (when Byte-8=02h), byte 73 for SHA-512 digest (when Byte-8=03h), and byte 25 for MD-5 digest (when Byte-8=06h).

Figure 4A:
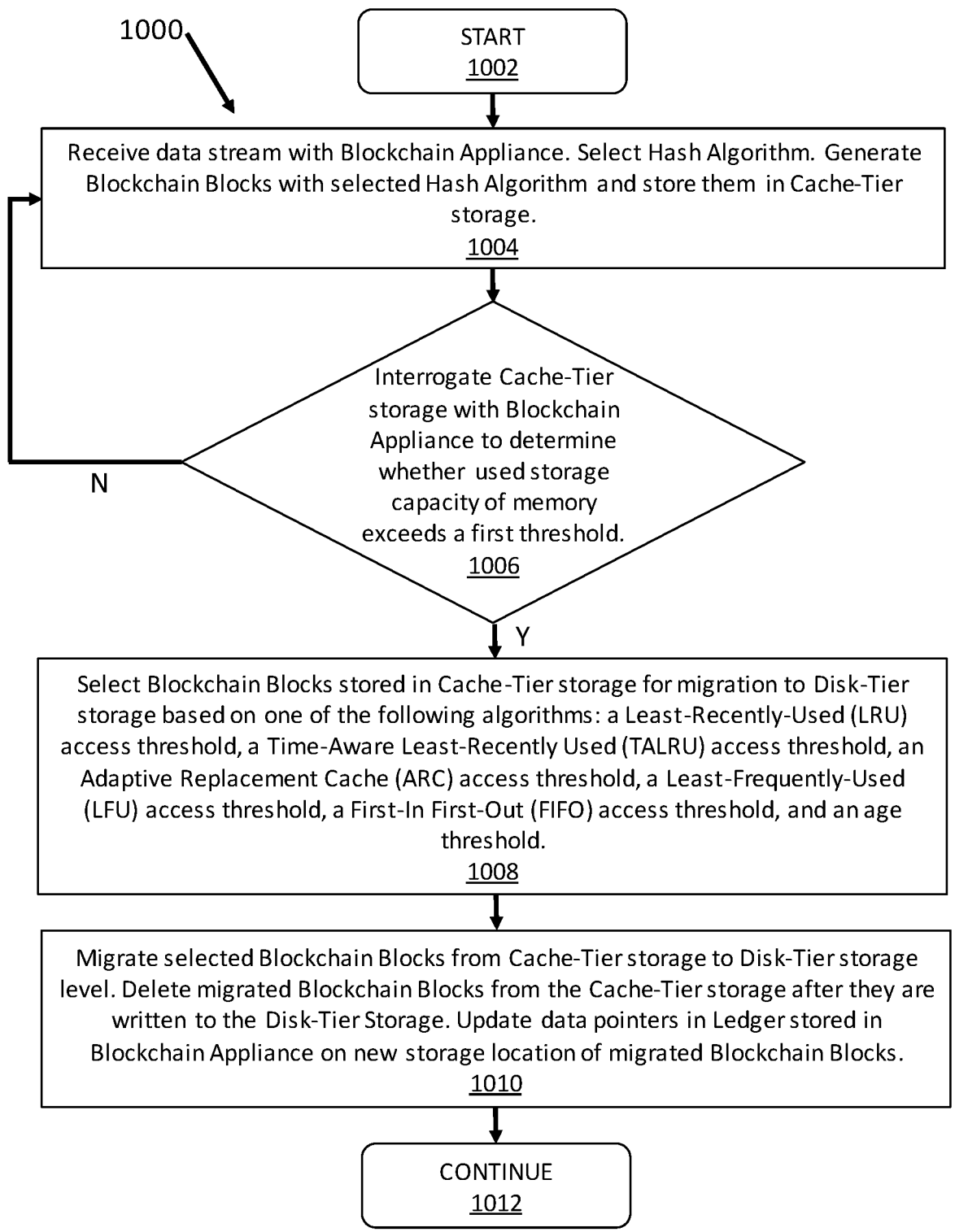
FIGS. 4A and 4B depict a flowchart that illustrates a method for receiving a data stream and configuring it into a blockchain technology for storage across a multi-tiered storage system according to a primary embodiment of the present specification in which blockchain blocks are migrated across a multi-tiered storage system based on aging parameters with a blockchain ledger that tracks the storage locations of the blockchain blocks.
Figure 4B:
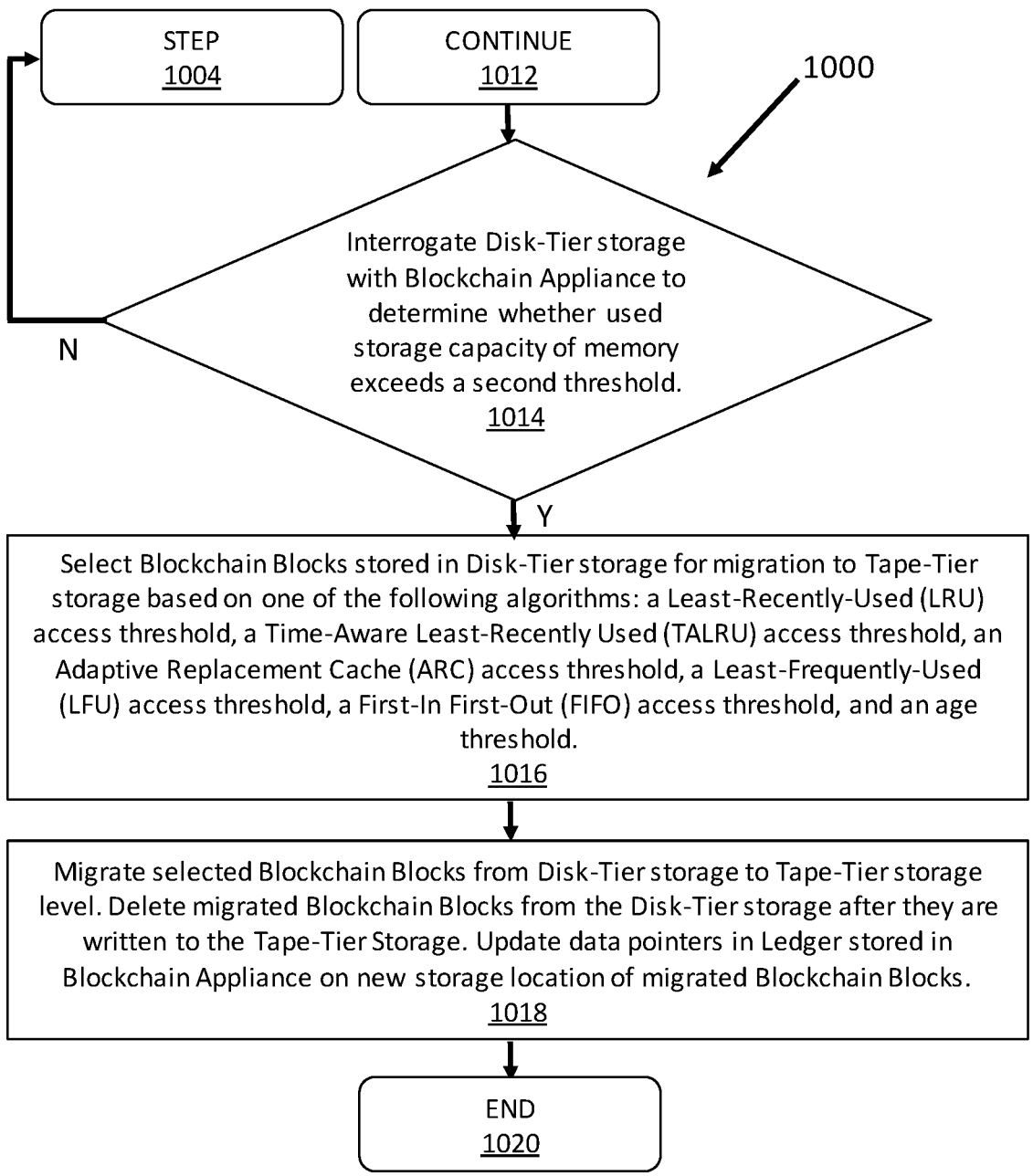

FIGS. 4A and 4B depict a flowchart 1000 that illustrates a method for receiving a data stream 10 and configuring it into a blockchain technology 14 for storage across a multi-tiered storage system 16, 18, and 20 according to a primary embodiment of the present specification in which blockchain blocks 36, 38, 40, 42, 44 are migrated across a multi-tiered storage system based on aging parameters with a blockchain ledger 34 that tracks the storage locations of the blockchain blocks 36, 38, 40, 42, and 44. The process begins with START 1002. In step 1004, Blockchain appliance 12 receives data stream 10. Data stream 10 may be any kind of digital data such as financial records, financial transactions, medical records, software, streaming media such as music or video, spreadsheets, software, or any form of digital data. Once blockchain appliance 12 receives data stream 10, blockchain appliance 12 selects a hash algorithm to convert data stream 10 in a series of blockchain blocks for blockchain 14. Blockchain appliance 12 then configures data stream 10 into blockchain 14 with the selected hash algorithm from table 100, such as SHA-224, SHA-256, SHA-384, SHA-512, SHA-512/224, SHA-512/256, or MD5. Once blockchain 14 is formed from data stream 10, blockchain appliance 12 stores blockchain 14 in cache-tier storage 16. In step 1006, blockchain appliance 12 monitors and interrogates cache-tier storage 16 to ascertain the amount of free storage capacity in cache-tier storage 16. If the used storage capacity of cache-tier storage 16 exceeds a preset threshold level, then blockchain appliance 12 proceeds to manage the blockchain blocks stored within cache-tier storage in step 1008. If the used storage capacity of cache-tier 16 does not exceed the preset threshold capacity level, then blockchain appliance 12 continues to receive data stream 10 and convert it into blockchain blocks for storage in cache-tier storage 16. Eventually, blockchain appliance 12 will store an amount of blockchain data in cache-tier storage 16 to cause the used amount of data storage within cache-tier storage 16 to exceed the preset memory storage capacity threshold. The present memory storage capacity threshold may be 60% of the cache storage tier be filled with data, or 80%, or 90%. It is desirable that the threshold level be greater than or equal to 60% of the cache storage tier being filled with data. The preset threshold provides a safety margin for the cache storage tier to ensure that there is always available storage capacity to receive and store new blockchain blocks generated by blockchain appliance 12. In step 1008, blockchain appliance 12 selects blockchain blocks stored in cache-tier storage for migration to disk-tier storage 18 based on preset selection criteria. These selection criteria may be based on age of the blockchain block, with older blockchain blocks being selected for migration. These selection criteria may also be based on access frequency of the blockchain block, with less frequently accessed blockchain blocks being migrated to disk-tier storage. Algorithms for selecting blockchain blocks for migration from cache-tier storage to disk-tier storage include a Least-Recently-Used (LRU) access threshold, a Time-Aware Least-Recently Used (TALRU) access threshold, an Adaptive Replacement Cache (ARC) access threshold, a Least-Frequently-Used (LFU) access threshold, a First-In First-Out (FIFO) access threshold, and an age threshold. In step 1010, blockchain appliance 12 migrates selected blockchain blocks from cache-tier storage 16 to disk-tier storage 18. Once these blockchain blocks are stored in disk-tier storage 18, blockchain appliance 12 deletes the migrated blockchain blocks from the cache-tier storage 16 to free up storage space for new blockchain data. Blockchain appliance 12 then updates data pointers to the migrated blockchain blocks stored in disk-tier storage 16 and records those updated data pointers in ledger 34 and as identified in table 100. The process continues in step 1012 on to FIG. 4B. In step 1014, blockchain appliance 12 monitors and interrogates disk-tier storage 18 to ascertain the amount of used and free storage capacity within disk-tier storage 18. The purpose for monitoring the used and free storage capacity within disk-tier storage 18 is to ensure that there is sufficient free storage capacity within disk-tier storage 18 for receiving additional blockchain blocks from cache-tier storage 18. While the amount of used storage within disk-tier storage 18 does not exceed a present threshold level, such as greater than or equal to 60% used storage or 80% used storage, blockchain appliance 12 continues to generate and store new blockchain blocks in cache 16 as per step 1004. However, eventually blockchain appliance 12 will migrate sufficient blockchain blocks to disk-storage tier 18 to fill up the storage of disk-tier storage 18 past the preset storage threshold. Once the used storage of disk-tier storage 18 exceeds the preset storage threshold level, in step 1016, blockchain appliance 12 selects blockchain blocks that are stored in disk-tier storage 18 for migration to tape-tier storage 20 based on specific selection criteria. These selection criteria include a Least-Recently-Used (LRU) access threshold, a Time-Aware Least-Recently Used (TALRU) access threshold, an Adaptive Replacement Cache (ARC) access threshold, a Least-Frequently-Used (LFU) access threshold, a First-In First-Out (FIFO) access threshold, and an age threshold. Once the blockchain blocks that meet the criteria according to one of these selection algorithms, in step 1018, blockchain appliance 12 migrates the selected blockchain blocks from disk-tier storage 18 over to tape-tier storage 20. Once the migrated blockchain blocks are stored in tape-tier storage 20, the blockchain blocks are deleted from disk-tier storage 18 to free up storage space to receive additional blockchain blocks from the cache-tier storage level. Through this process 1000, blockchain appliance 12 is able to store blockchain blocks from blockchain 14 across multiple tiers of a storage system 16, 18, and 20. These selection criteria push older less frequently accessed blockchain blocks to longer term storage tiers such as disk-tier storage 18 or tape-tier storage 20 that have larger storage capacities, longer data storage retention lifespans, and longer latency for accessing data. New blockchain blocks that are frequently accessed and recently used are maintained in cache-tier storage that has low latency for accessing data. As such, process 1000 enables for the smart allocation of available storage across tiers 16, 18, and 20 for storing blockchain 14. The process ENDS in step 1020.

Figure 5:
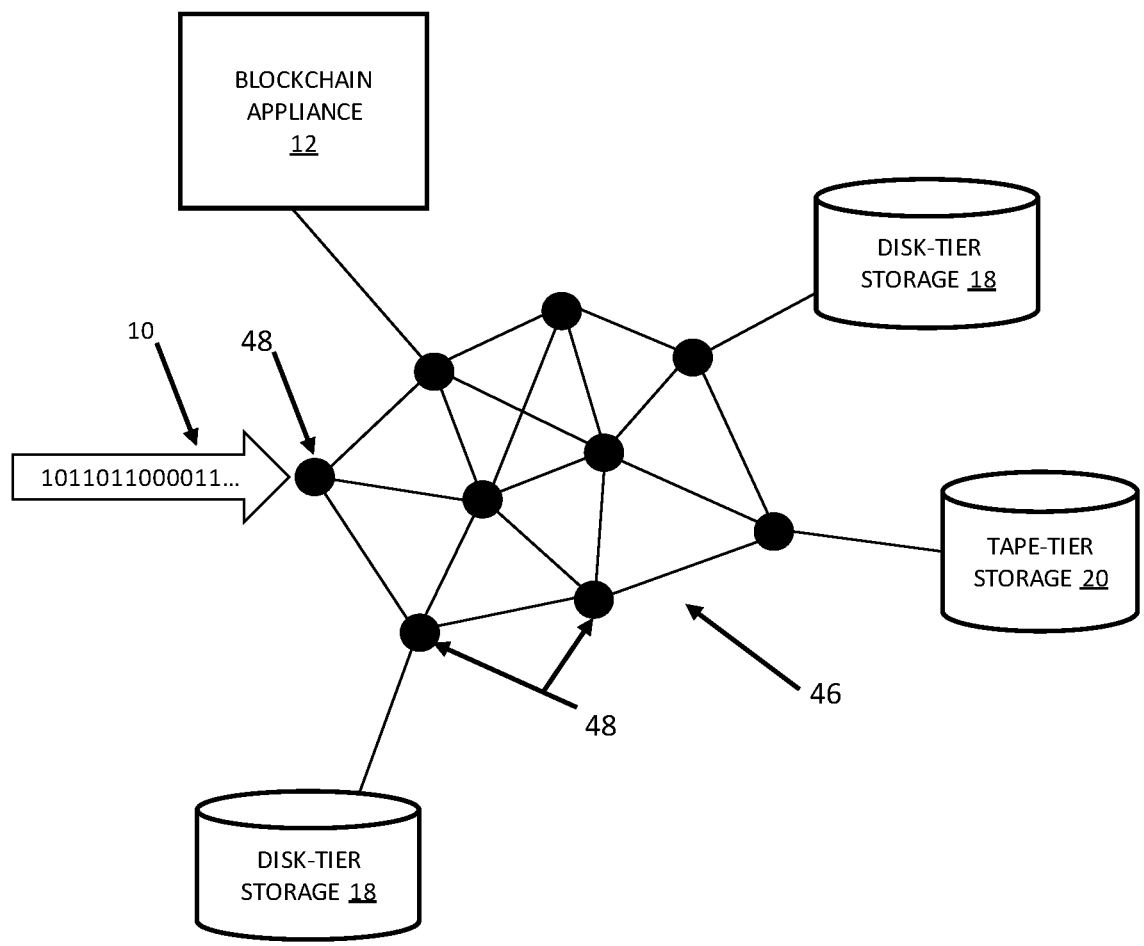
FIG. 5 illustrates a block diagram of a data stream being received by a node on a distributed network that has cache memory storage that is in bidirectional communication with a blockchain appliance, disk-tier storage, and tape-tier storage through the distributed network.

FIG. 5 illustrates a block diagram of a data stream 10 being received by a node 48 on a distributed network 46 that has cache memory storage 16 on it that is in bidirectional communication with a blockchain appliance 12, disk-tier storage 18, and tape-tier storage 20 through the distributed network 46. Distributed network 46 is a network such as the internet. Distributed network 46 is composed of a plurality of nodes 48, each of which includes cache-tier storage 16. Blockchain appliance 12 is in bidirectional communication with distributed network 46, and by extension, every node 48 of distributed network 46. Any node 48 of network 46 may receive data stream 10 for the purpose of converting it into blockchain 14. In order to convert data stream 10 into blockchain 14, node 48 will bidirectionally communicate with blockchain appliance 12 to implement process 1000. Network 46 is in communication with disk-tier storage units 18, an exemplary two of which are shown. Network 46 may be in communication with any number of disk-tier storage units 18, which are likely organized into data storage farms. It is contemplated that there are fewer disk-tier storage nodes 18 than there are cache-tier storage nodes 16. Network 46 is shown in communication with tape-tier storage 20. Tape-tier storage 20 may be a remote disaster recovery storage facility that is located at a geographic distance away from network 46 to protect blockchain 14 data from natural disasters. While only one tape-tier storage 20 is shown in FIG. 5, this is merely exemplary. However, it is contemplated that there will be fewer tape-tier storage nodes 20 than disk-tier storage nodes 18.

Figure 6:
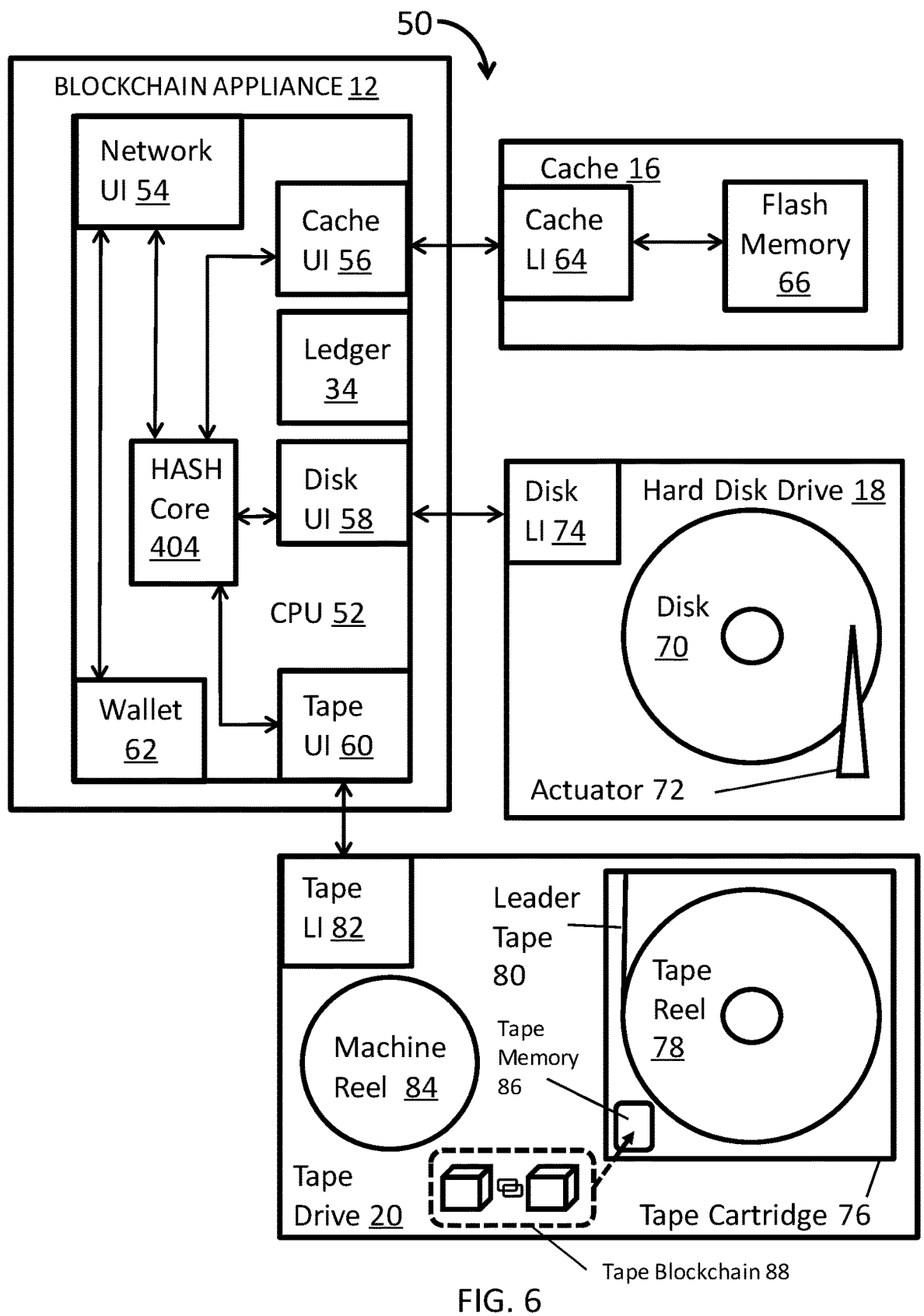
FIG. 6 illustrates a block diagram of a blockchain appliance in bidirectional communication with a cache memory device, a hard disk drive, and a magnetic tape drive.

FIG. 6 illustrates a block diagram of a blockchain appliance 12 in bidirectional communication with a cache memory device 16, a hard disk drive 18, and a magnetic tape drive 20. Blockchain appliance 12 includes a CPU 52. Central Processing Unit (CPU) 52 has a network upper-interface (UI) 54, such as for attaching to network 46, FIG. 5. CPU 52 also has a cache UI 56 for bidirectional communications with cache lower-interface (LI) 64 of cache 16, disk UI 58 for bidirectional communications with disk LI 74 of hard disk drive 16, and tape UI 60 for bidirectional communications with tape LI 82 of tape drive 20. CPU 52 also has one or more hash cores, such as hash core 404 of FIG. 7, a wallet 62 for the security credentials of users, and a blockchain ledger 34 for storing data-pointers. Cache 16 also contains flash memory 66 that is electrically or optically connected to cache LI 64. While EEPROMs had to be completely erased before being rewritten, NAND-type flash memory may be written and read in blocks (or pages) that are generally much smaller than the entire device. NOR-type flash allows a single machine word (byte) to be written, to an erased location, or read independently. Flash memory 66 may be one or more chips attached to a motherboard, or chips within a solid-state drive (SSD). When SSDs are used as cache 16, cache UI 56 and cache LI 64 may communicate via one of these communication protocols: SATA (Serial Advanced Technology Attachment), FC (Fibre Channel), SAS (Serial Attached SCSI), ATA/IDE (Advanced Technology Attachment/Integrated Drive Electronics), PCIe (Peripheral Component Interconnect Express), USB (Universal Serial Bus), IEEE-1394 (Firewire), and the like. Hard disk drive 18 also contains one or more rotating disks 70 which are accessed via a rotary actuator 72. At the tip of this rotary actuator is a giant magneto-resistive (GMR) read head and a thin-film write head. Disk UI 58 and disk LI 74 may communicate via one of these communication protocols: SATA (Serial Advanced Technology Attachment), PATA (Parallel Advanced Technology Attachment), SCSI (Small Computer System Interface), SAS (Serial Attached SCSI), FC (Fibre Channel), NAS (Network Attached Storage), and the like. Hard disk drive 18 has a slower access time than cache 16 because of the seek time of the rotary actuator to the desired data track and the latency time before the disk rotates into position for I/O. However, disk drive 18 generally has a longer life span than cache 16 which degrades with each access operation. Tape drive 20 houses removable tape cartridge 76. Tape cartridge 76 houses a single tape reel 78. Tape drive 20 threads leader tape 80 across a read-write head (not shown) to an awaiting machine reel 84 that are both permanent parts of tape drive 20. Tape cartridge 76 may be a Linear Tape Open (LTO) Ultrium, an IBM® 3592, or an Oracle® StorageTek T10000 or T10000-T2 single-reel tape cartridge. Tape UI 60 and tape LI 82 may communicate via one of these communication protocols: SATA (Serial Advanced Technology Attachment), SCSI (Small Computer System Interface), SAS (Serial Attached SCSI), FC (Fibre Channel), IEEE-1394 (Firewire), FICON (IBM Fibre Connection), and the like. The robotic picker in a tape library may take 10 seconds to load tape cartridge 76 into tape drive 20, and the seek time to locate data on the tape may take a minute or more. Thus, tape is slower than hard disk 18, although tape cartridge consumes zero power once I/O is completed with it. Disk of hard drive 18 may rotate at 7200 RPM, giving a latency of 4.16 milliseconds (time for ½ revolution) and have a seek time of 8 milliseconds (time for ⅓ stroke of the actuator), giving an access time of 12.16 milliseconds, which is much faster than tape, but is much more expensive than tape to provide. The access time for flash cache might be measured in microseconds or faster, but that flash cache costs more than hard disk and hard disk costs more than tape. However, there is also a life span consideration. Flash memory that forms cache degrades with usage. Magnetic disks last 3-5 years. Magnetic tape lasts 10-20 years. So, there are price-performance tradeoffs and that is why there are three storage tiers.

Figure 7:
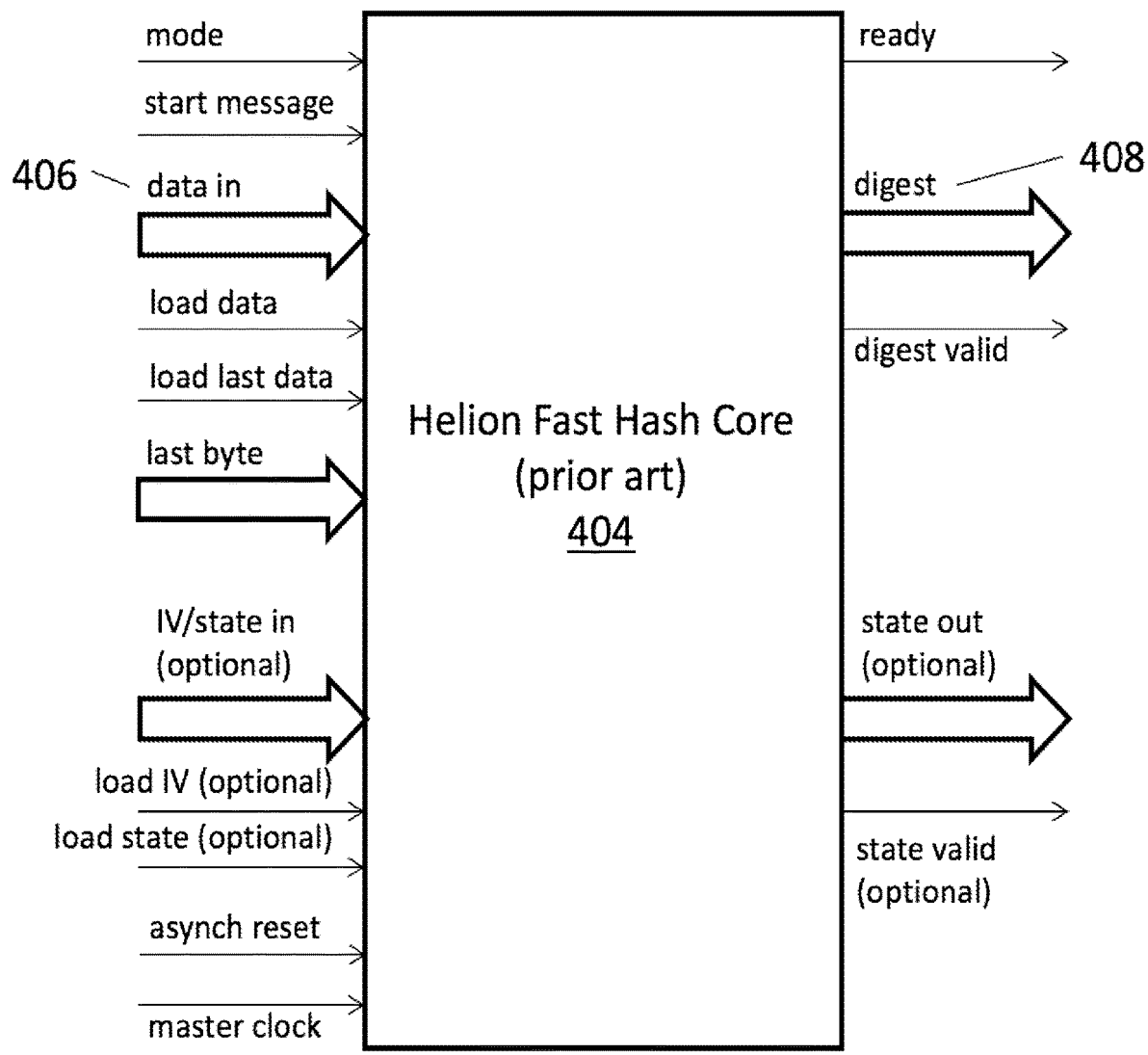
FIG. 7 illustrates a prior art Helion has hash core used for generating hash digests on blockchain blocks.

FIG. 7 illustrates a prior art Helion Fast Hash Core Application Specific Integrated Circuit (ASIC) 404 used for generating hash digests on blockchain blocks for blockchain 14, which may be resident in CPU 52. The Helion Fast Hash Core family implements the NIST approved SHA-1, SHA-224, SHA-256, SHA-384 and SHA-512 secure hash algorithms to FIPS 180-3 and the legacy MD5 hash algorithm to RFC 1321. These are high performance cores that are available in single or multi-mode versions and have been designed specifically for ASIC. Data to be blockchained is fed into this ASIC at 406 and the resulting blockchain hash digest output is 408. Such dedicated hash core ASICs have faster performance than software running in a cloud or computer memory under an operating system. Hash core 404 could calculate the blockchain hash digest starting with byte 18 in FIG. 3.

Figure 8:
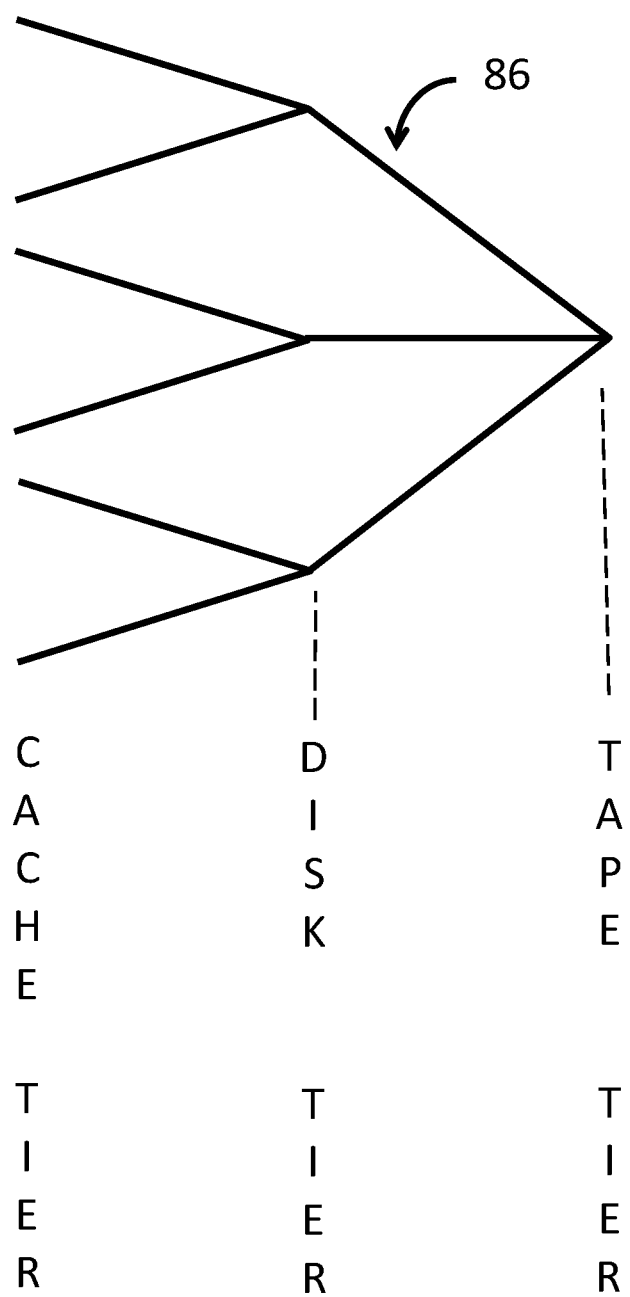
FIG. 8 illustrates the multi-tiered storage system according to the present specification in a tree diagram that takes the configuration of a Merkle Tree.

FIG. 8 illustrates the multi-tiered storage system according to the present specification in a tree diagram that takes the configuration of a Merkle Tree 86. The cache-tier nodes 16 are where the new blockchain blocks are generated and stored. Based on selection criteria, selected blockchain blocks are migrated from the cache-tier 16 to the disk-tier 18 and eventually on to the tape-tier 20. The number of nodes 48 in the cache-tier 16 is larger than the number of nodes in the disk-tier 18, and the number of nodes in the disk-tier 18 is larger than the number of nodes in the tape-tier 20. As such, the nodes of the cache, disk, and tape-tiers are organized in a convergent Merkle Tree 86 where cache-tier nodes have the place of the leaf nodes of the Merkle Tree, the disk-tier nodes take the place of the mid-tier branch nodes of the Merkle Tree, and the tape-tier nodes take the place of the root node of the Merkle Tree. The organization of the storage tiers 16, 18, and 20 in a Merkle Tree configuration allows for similar data structure organization of blockchain 14 into a Merkle Tree data structure for archival preservation.

FIG. 9 illustrates a blockchain 88 stored across a multi-tiered storage system 16, 18, and 20 with a ledger 34 maintained by the blockchain appliance 12 that tracks the location of blockchain blocks 211, 212, 213, 214, 215, and 216 across the various storage tiers 16, 18, and 20 where a secondary archival blockchain 90 and 92 secures blockchain blocks 211, 212, 213, 214, 215, and 216 as they are migrated from the cache storage tier 16 to the disk storage tier 18 and the tape storage tier 20. FIG. 9 illustrates an alternative embodiment for executing an archival blockchain storage system. Blockchain appliance 12 receives data stream 10 and creates blockchain blocks 211, 212, 213, 214, 215, and 216 from that data stream 10. As blockchain blocks 211, 212, 213, 214, 215, and 216 are created, blockchain appliance 12 stores them in cache storage tier 16. As cache storage tier 16 fills up its memory capacity with blockchain blocks, blockchain appliance 12 interrogates the blockchain blocks 211, 212, 213, 214, 215, and 216 stored in cache 16 to determine which ones should be migrated to disk storage tier 18 based on certain selection criteria. When blockchain appliance 12 selects a group of blockchain blocks for migration to disk storage tier 18, blockchain appliance 12 wraps that group of blockchain blocks within a disk-tier storage (DTS) blockchain block 90 to generate DTS archival blockchain blocks 221, 222, and 223. Blockchain appliance 12 then stores that blockchain block 90 (221, 222, 223) containing the selected blockchain blocks from cache storage tier 16 and deletes the duplicate blockchain blocks remaining on cache storage tier 16 to free up memory space for additional new blockchain blocks created by blockchain appliance 12 from data stream 10. In disk storage tier 18, there are three DTS blockchain blocks 221, 222, and 223 that each wrap one or more blockchain blocks that were selected and migrated from cache storage tier 16. Per FIG. 11A, blockchain blocks 211 and 212 stored in cache 16 are migrated to disk-tier storage 18 by wrapping them in archival DTS block 221. Per FIG. 11A, blockchain blocks 213 and 214 stored in cache 16 are migrated to disk-tier storage 18 by wrapping them in archival DTS block 222. Per FIG. 11A, blockchain blocks 215 and 216 stored in cache 16 are migrated to disk-tier storage 18 by wrapping them in archival DTS block 223. In this embodiment, all blockchain blocks created by blockchain appliance 12 and stored in cache 16 are wrapped within a secondary disk-tier storage blockchain block 221, 222, and 223 when they are migrated to the disk-tier storage level 18 per process 2000 in FIGS. 10A and 10B. DTS block 90 is a generic exemplary archival disk-tier storage block representative of blocks 221, 222, and 223. The secondary disk-tier storage blockchain block functions as an archival blockchain to ensure the data integrity of blockchain blocks 211, 212, 213, 214, 215, and 216 as they are migrated and moved around the multi-tiered storage system 16, 18, and 20. As blockchain appliance 12 migrates blockchain blocks 211, 212, 213, 214, 215, and 216 from cache 16 to disk 18, disk 18 will fill with data. Once disk 18 fills with sufficient blockchain data past a particular specified threshold, blockchain appliance 12 will interrogate DTS archival blockchain blocks 221, 222, and 223 to determine which one of those should be migrated to the tape storage tier 20 based on selection criteria. When blockchain appliance 12 determines that one or more archival blockchain blocks 221, 222, and/or 223 should be migrated to tape storage tier 20 based on specified selection criteria, blockchain appliance will wrap the selected archival disk-tier storage blocks 221, 222, and/or 223 within an additional secondary archival storage blockchain block, a tape-tier storage (TTS) blockchain block 92, thereby forming archival tape-tier storage block 231 stored on tape storage tier 20. In this example, blockchain appliance determined that blockchain blocks 211 and 212 were the only ones that met the selection criteria for migration to the disk-tier storage after cache 16 reached the storage threshold, and thereby wrapped them into archival DTS storage block 221 that was stored on disk storage tier 18. When blocks 211 and 212 were selected and migrated to disk 18 via archival DTS block 221, blockchain blocks 211 and 212 were deleted from cache 16, thereby freeing memory space in cache 16. Then at a later point, blockchain appliance determined that blockchain blocks 213 and 214 were the only remaining two blockchain blocks in cache 16 that met the selection criteria for migration to the disk storage tier after the cache-tier reached the storage threshold again. Blocks 213 and 214 were wrapped in archival DTS block 222 and migrated to disk 18. Duplicate blocks 213 and 214 were then deleted from cache 16, thereby freeing memory space in cache 16. When cache once again reached the storage threshold level, blockchain appliance 12 interrogated the remaining blockchain blocks stored in cache 16 and determined that blocks 215 and 216 met the selection criteria. Blockchain appliance 12 then wrapped blocks 215 and 216 in archival DTS blockchain block 223 that was then stored on disk 18, therefore migrating blocks 215 and 216 from cache 16 to disk 18. When creating archival DTS blockchain blocks 221, 222, and 223, blocks 221, 222, and 223 are blockchained together to maintain the integrity of blockchain 88 as it is moved from cache 16 to disk 18. With the migration of blocks 221, 222, and 223 to disk 18, disk 18 eventually reaches its storage threshold and blockchain appliance 12 determined that blocks 221, 222, and 223 met the selection criteria for migration to tape 20. Blockchain appliance 12 then wrapped selected blocks 221, 222, and 223 into archival TTS block 231 which is stored on tape storage tier 20. With the migration of blocks 221, 222, and 223 from disk 18 to tape 20, blocks 221, 222, and 223 stored on disk storage tier 18 are deleted to free up space in disk 18 for further archival DTS blocks. In this embodiment, the integrity of blockchain 88 is maintained by wrapping migrated blockchain blocks in a secondary archival blockchain as they are moved from one storage tier to another. Blockchain blocks moved from cache 16 to disk 18 are wrapped in an archival DTS blockchain block. All other blockchain blocks within the same blockchain are wrapped in archival DTS blockchain blocks that are blockchained together to preserve the integrity of blockchain 88. Similarly, when those archival DTS blockchain blocks are migrated to tape 20, they are wrapped in a tape-tier storage archival blockchain block to preserve the integrity of blockchain 88. While one archival tape-tier storage blockchain block 231 is shown, it is contemplated that as other groups of archival disk-tier storage blockchain blocks are grouped into sets and migrated to tape 20, that other archival tape-tier storage blocks 92 will be created and be blockchained to block 231. As blockchain 88 is stored across multiple storage tiers 16, 18, and 20, data pointers to each of those individual blockchain blocks are generated and updated through ledger 34 to maintain blockchain 88 as a logically contiguous blockchain. Whenever blockchain blocks are migrated to a different storage tier, the data pointer in ledger 34 is updated. Ledger 34 includes a listing of the unique identification number for each blockchain, the unique identification number for each blockchain block within that blockchain, and the data pointer for each blockchain block. The data pointer for each blockchain block includes the storage tier level, the storage address for the blockchain block within that level, and the data length of the blockchain block.

Figure 10A:
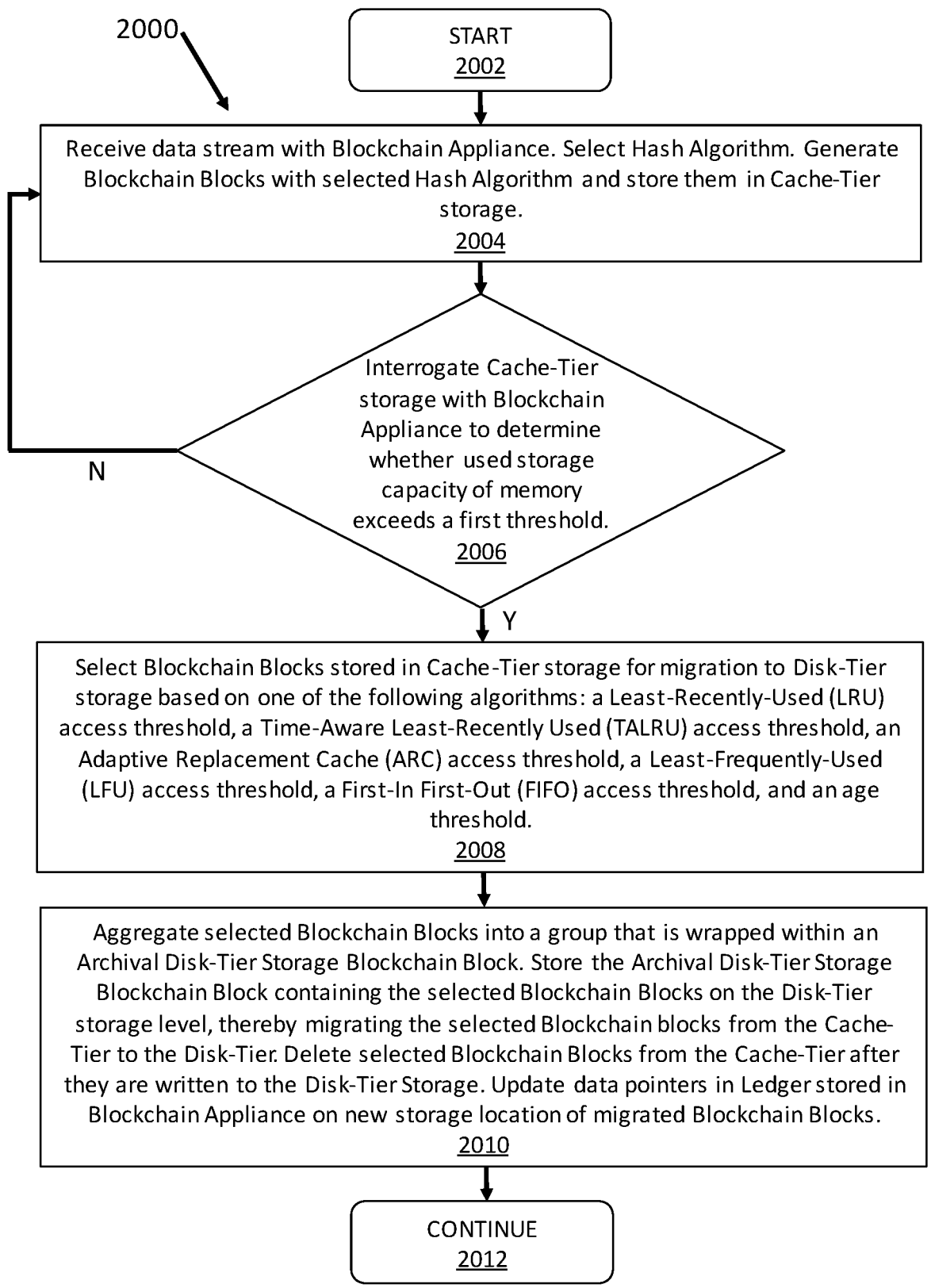
FIGS. 10A and 10B depict a flowchart that illustrates a method for receiving a data stream and configuring it into a blockchain technology for storage across a multi-tiered storage system according to a secondary embodiment of the present specification in which blockchain blocks are migrated across a multi-tiered storage system based on aging parameters with a blockchain ledger that tracks the storage locations of the blockchain blocks where the blockchain blocks are secured with a secondary archival blockchain that wraps and secures blockchain blocks as they are moved from the cache storage tier to the disk storage tier and the tape storage tier.
Figure 10B:
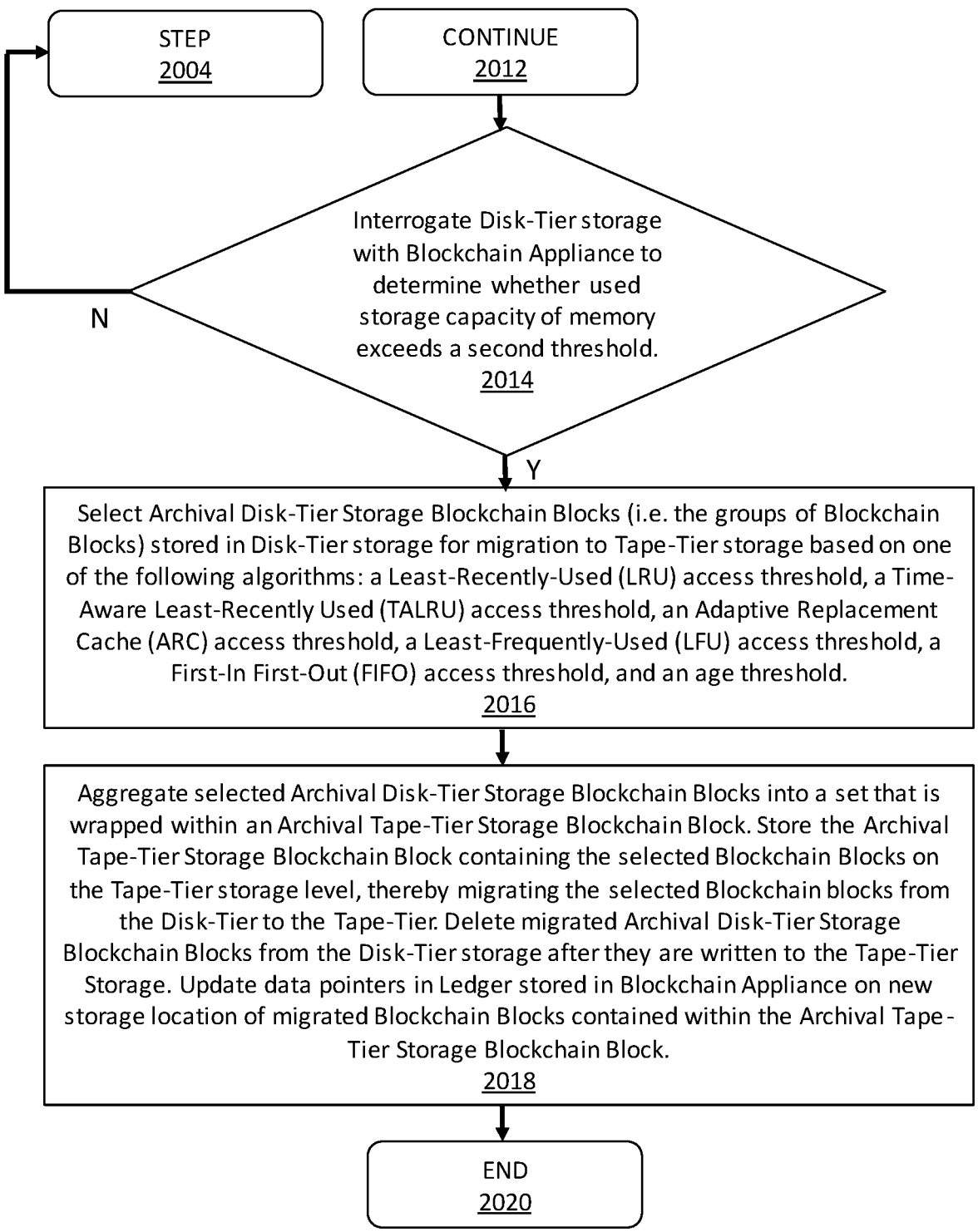

FIGS. 10A and 10B depict a flowchart 2000 that illustrates a method for receiving a data stream 10 and configuring it into a blockchain technology 88 for storage across a multi-tiered storage system 16, 18, and 20 according to a secondary embodiment of the present specification in which blockchain blocks are migrated across a multi-tiered storage system based on aging parameters. A blockchain ledger tracks the storage locations of the blockchain blocks. The blockchain blocks are secured with a secondary archival blockchain 90 and 92 that wraps and secures blockchain blocks as they are moved from the cache storage tier 16 to the disk storage tier 18 and the tape storage tier 20. The process begins with START 2002. In step 2004, blockchain appliance 12 receives data stream 10 at a network node 46. Blockchain appliance 12 then selects a hash algorithm to apply to the data stream as it is fragmented to generate blockchain blocks 211, 212, 213, 214, 215, and 216. Once blockchain blocks 211, 212, 213, 214, 215, and 216 are generated by blockchain appliance 12, they are stored in cache-tier storage 16. As blockchain blocks are generated and stored in cache 16, it becomes necessary to monitor the free storage capacity of cache 16. Eventually cache 16 will fill with blockchain data and not have the capacity to store any additional new blockchain blocks. Thus, in step 2006, blockchain appliance monitors and interrogates cache-tier storage 16 to determine whether its used storage capacity has exceeded a specified storage capacity threshold, such as 60% filled or 80% filled. If the actual amount of used storage space in cache 16 does not exceed this specified threshold, then blockchain appliance reverts to step 2004 and continues to generate and store new blockchain blocks in cache 16. Blockchain appliance 12 generates data pointers to the blockchain blocks stored in cache 16 and records them in ledger 34. However, when sufficient blockchain data has been stored in cache 16 such that the storage capacity threshold has been reached, then blockchain appliance 12 proceeds to step 2008. In step 2008, blockchain appliance 12 selects which of the blockchain blocks stored in cache 16 meet certain selection criteria for migration to disk storage tier 18. These selection criteria algorithms include a Least-Recently-Used (LRU) access threshold, a Time-Aware Least-Recently Used (TALRU) access threshold, an Adaptive Replacement Cache (ARC) access threshold, a Least-Frequently-Used (LFU) access threshold, a First-In First-Out (FIFO) access threshold, and an age threshold. Once blockchain appliance 12 has selected particular blockchain blocks stored in cache 16 that has met the selection criteria, blockchain appliance 12 moves to step 2010. In step 2010, blockchain appliance aggregates the selected blockchain blocks into a group that is wrapped within an archival disk-tier storage blockchain block. Blockchain appliance 12 then stores the archival disk-tier storage blockchain block in the disk storage tier 18, thereby migrating the selected blockchain blocks from the cache storage tier 16 to the disk storage tier 18. The migrated blockchain blocks are then deleted from cache 16 to free up memory space for new blockchain blocks created by blockchain appliance 12. With the migration of the blockchain blocks from cache 16 to disk 18 via the archival disk-tier storage blockchain block, blockchain appliance 12 updates the data pointers that identified where the blockchain blocks were stored in cache 16 to where they are now stored on disk 18. The process continues in step 2012. As blockchain appliance 12 stores archival disk-tier storage blockchain blocks on disk storage tier 18, disk storage tier 18 will eventually fill up with data and not be able to store additional blockchain blocks. Thus, in step 2014, blockchain appliance 12 monitors and interrogates disk storage tier 18 to determine the amount of used storage space and the amount of free storage space and compares it to a preset storage threshold. When there is sufficient free storage space in the disk storage tier 18 such that it does not hit the preset storage threshold, the process proceeds to step 2004 where the blockchain appliance 12 continues to generate and store blockchain blocks on cache storage tier 16. However, when the amount of used storage space in disk storage tier 18 reaches the preset storage threshold, blockchain appliance 12 proceeds to step 2016 to select archival disk-tier storage blockchain blocks that it can migrate up to tape storage tier 20 in order to free up space on disk storage tier 18. In step 2016, blockchain appliance 12 selects archival disk-tier storage blockchain blocks on disk storage tier 18 that it can migrate to tape storage tier 20 based on one of the following criteria algorithms: a Least-Recently-Used (LRU) access threshold, a Time-Aware Least-Recently Used (TALRU) access threshold, an Adaptive Replacement Cache (ARC) access threshold, a Least-Frequently-Used (LFU) access threshold, a First-In First-Out (FIFO) access threshold, and an age threshold. Once blockchain appliance 12 has selected one or more archival disk-tier storage blockchain blocks on disk storage tier 18 that it can migrate to tape storage tier 20, it groups them into a set and wraps them within an archival tape-tier storage blockchain block and stores that archival tape-tier storage blockchain block on the tape-tier storage level 20, thereby migrating the blockchain blocks 211-216 up from the disk storage tier 18 to the tape storage tier 20. Once the archival tape-tier storage blockchain block is stored on the tape storage tier 20, blockchain appliance 12 deletes the migrated archival disk-tier storage blockchain blocks from the disk storage tier level 18. The blockchain appliance then updates the data pointers to the migrated blockchain blocks in ledger 34 once they have been moved to their new storage locations in the tape-tier storage 20. The process then ENDS with step 2020. As discussed in FIGS. 10A-10B, an instance of blockchain blocks being migrated to the disk-tier storage level, or the tape-tier storage level generates the secondary archival blockchain blocks, DTS block 90 and TTS block 92.

Figure 11A:
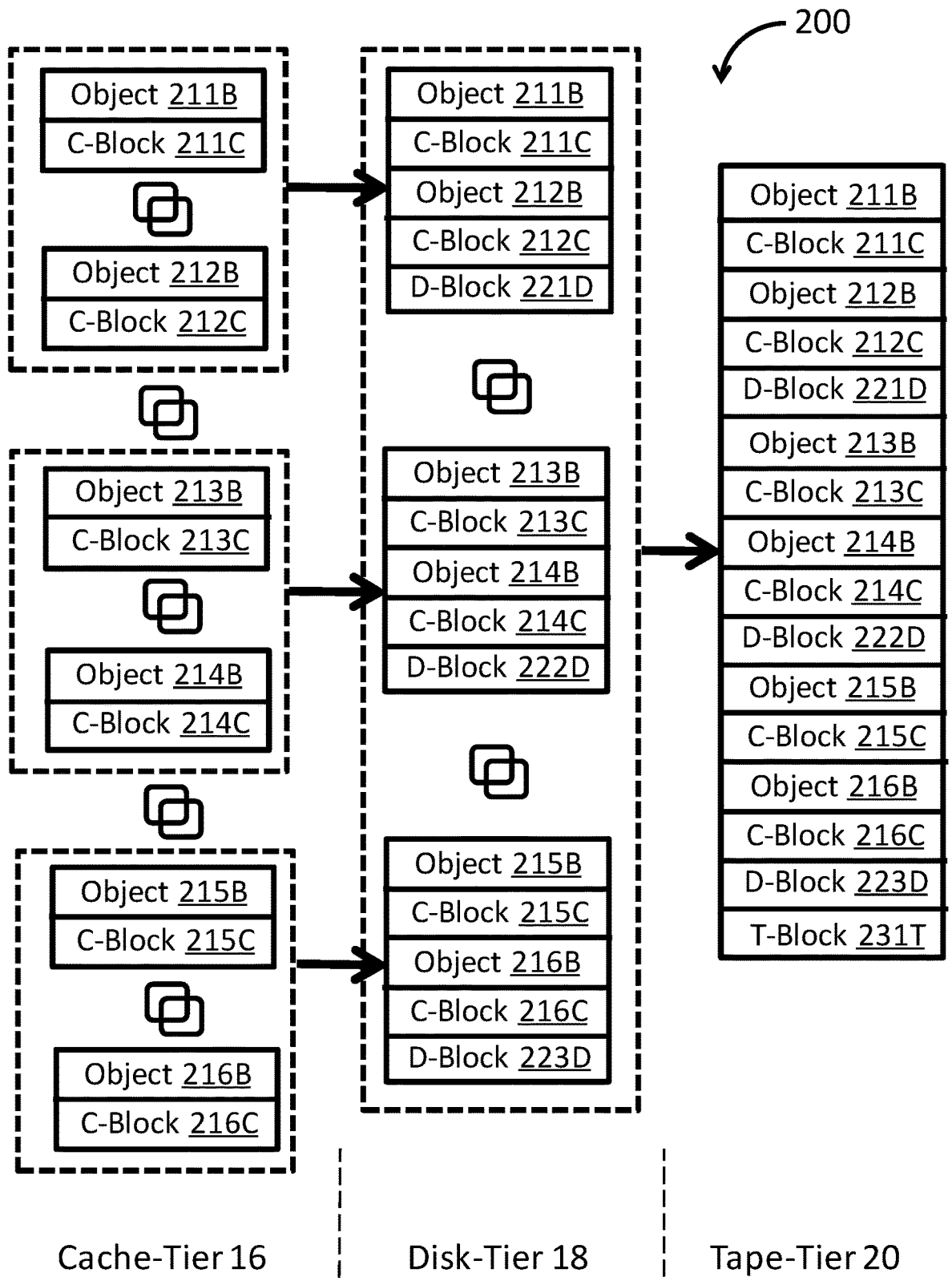

FIGS. 11A-11F depict a blockchain 200 that has been stored on a multi-tiered storage system 16, 18, and 20 where a secondary archival blockchain 90 and 92 wraps and secures blockchain blocks 211-216 as they are moved from the cache storage tier 16 to the disk storage tier 18 and the tape storage tier 20. FIG. 11A illustrates a block diagram of a blockchain 200 stored across a multi-tiered storage system 16, 18, and 20 where a secondary archival blockchain wraps 90 and 92 and secures blockchain blocks 211-216 as they are moved from the cache storage tier 16 to the disk storage tier 18 and the tape storage tier 20. Blockchain block 211 is formed by blockchain appliance 12 from data stream 10 by applying a hash algorithm to data stream 10. Data stream 10 comes into blockchain appliance 12 through network UI 54 into CPU 52. CPU 52 then utilizes hash core 404 to form hash digests on data objects contained within data stream 10 to generate blockchain blocks, like blockchain block 211-216. Blockchain block 211 is formed of a data object 211B and a C-Block 211C that includes the hash digest information on data object 211B. C-Block 211C also contains the information from table 100. C-Block 211C has the C-designation as this is the blockchain block information generated and associated with object 211B in the cache-tier 16. The C-designation goes with C for Cache. Table 100 provides a listing by byte of the information contained within C-Block 211C, such as the hash algorithm identifier 102G and hash digest 102I. Blockchain appliance 12 generates C-Block 211C to include a hash digest via hash core 404 as well as all of the information listed in table 100. Together, C-Block 211C and data object 211B form blockchain block 211. Similarly, data objects 212B, 213B, 214B, 215B, and 216B were extracted from blockchain appliance 12 from data stream 10 as it reached CPU 52 through network UI 54. Using hash core 404, CPU 52 generated hash digests from data objects 212B, 213B, 214B, 215B, and 216B along with associated information for table 100 and placed those hash digests and associated blockchain information for table 100 into associated C-Blocks 212C, 213C, 214C, 215C, and 216C. Together, 212B and 212C form blockchain block 212. Together, 213B and 213C form blockchain block 213. Together, 214B and 214C form blockchain block 214. Together, 215B and 215C form blockchain block 215. Together, 216B and 216C form blockchain block 216. Per table 100, each C-Block, 211C, 212C, 213C, 214C, 215C, and 216C includes a blockchain ID 102A, blockchain block ID 102B, and data pointer 102C. Data pointer 102C provides the storage location of each blockchain block 211-216 within cache storage tier 16. When blockchain blocks 211-216 are stored within cache storage tier 16, blockchain appliance 12 generates data pointers 102C for each blockchain block 211-216 and records those data pointers within ledger 34. From data stream 10, blockchain appliance 12 uses hash core 404 to generate all blockchain blocks 211-216 and stores them in cache storage tier 16. With time, blockchain appliance 12 will fill up the memory storage available in cache storage tier 16, which would prevent blockchain appliance 12 from being able to generate and store new blockchain blocks in cache storage tier 16. To prevent this occurrence from happening, blockchain appliance 12 applies the memory storage allocation usage process outlined in process 2000 to determine the amount of used storage space in cache 16 and compare it to a preset storage threshold. In this case, blockchain appliance initially determined the cache 16 met the threshold trigger to migrate certain blockchain blocks to disk storage tier 18. In this case, at the first triggering of the storage threshold level, blockchain appliance 12 determined that blockchain blocks 211 and 212 met the selection criteria for migration to disk storage tier 18. Per process 2000, blockchain appliance 12 aggregated blockchain blocks 211 and 212 into a group and wrapped that group within archival disk-tier storage block 90 to form archival DTS storage blockchain block 221. Archival DTS storage blockchain block 221 includes data object blocks 211B and 212B and associated C-Blocks 211C and 212C, which are all appended with D-Block 221D. A hash digest of blockchain blocks 211 and 212 is created and stored in D-Block 221D. D-Block 221D also includes tabular information 100 updated for having blockchain blocks 211 and 212 as data and storage on disk storage tier 18.

Archival DTS storage block 221 is formed of data object blocks 211B and 212B and associated C-Blocks 211C and 212C, which are all appended with D-Block 221D. When blockchain blocks 211 and 212 are grouped and wrapped within archival DTS storage blockchain block 221 and stored on disk storage tier 18, blockchain blocks 211 and 212 are deleted from cache storage tier 16 to free up space on cache storage tier 16 for additional blockchain information. Blockchain appliance 12 then updates the data pointers for blockchain blocks 211 and 212 in ledger 34. Subsequently, blockchain appliance 12 continued to monitor cache-tier storage 16 with respect to its memory storage capacity and determined that it once again exceeded the specified storage threshold per process 2000. Blockchain appliance 12 then determined that blockchain blocks 213 and 214 met the selection criteria for migration to disk-tier storage 18. Blockchain appliance therefore grouped blockchain blocks 213 and 214 and wrapped them within archival DTS storage blockchain block 90 to form archival DTS storage blockchain block 222. Archival DTS blockchain block 221 is formed by creating a hash digest of blockchain blocks 213 and 214 and block 221 and storing that hash digest information in D-Block 222D along with information from table 100. Once blockchain blocks 213 and 214 are wrapped within D-Block 222D, blockchain blocks 213 and 214 are deleted from cache storage tier 16 to free up memory for new blockchain blocks. Blockchain appliance 12 then updates the data pointers for blockchain blocks 213 and 214 in ledger 34. After blockchain blocks 213 and 214 are deleted from cache 16, process 2000 continues and blockchain appliance generates new blockchains and stores them in cache 16. Eventually, the creation and storage of new blockchain blocks in cache 16 triggers the storage threshold of the cache-tier storage 16 again causing blockchain appliance to examine the remaining blockchain blocks for migration into disk-tier storage 18. At this point, blockchain appliance 12 determined that blockchain blocks 215 and 216, formed of data object blocks 215B and 215C, and 216B and 216C respectively, meet the selection criteria for migration to disk-tier storage 18. As such, blockchain blocks 215 and 216 are grouped and have a new hash digest formed of both of those blockchain blocks and block 222, which is then stored in D-Block 223D. D-Block 223D also includes information from table 100. Together, archival DTS storage blockchain block 223 is formed of blockchain blocks 215, 216, and D-Block 223D. Note that the descriptor D in blockchain blocks 221, 222, and 223 refers to the fact that these blockchain blocks are associated with the Disk-Tier storage level 18. Once archival DTS storage blockchain block 223 is generated and stored on disk-tier storage level 18, blockchain blocks 215 and 216 are deleted from cache-tier storage 16 to create more room for new blockchain blocks. Blockchain appliance 12 then updates the data pointers for blockchain blocks 215 and 216 in ledger 34. At this point, per process 2000, blockchain appliance 12 determines that disk-tier storage 18 has exceeded its storage threshold level and selects archival DTS storage blockchain blocks 221, 222, and 223 for migration to tape-tier storage 20 per the selection criteria. Blockchain appliance 12 groups archival DTS blockchain blocks 221, 222, and 223 together and forms a hash digest from them and stores in T-Block 231T. The T descriptor in T-Block 213T refers to the fact that this blockchain block resides on the tape-tier storage level 20. T-Block 231T also includes all information from table 100. Once blockchain appliance 12 wraps archival DTS blockchain blocks 221, 222, and 223 into archival TTS blockchain block 92 to form archival TTS blockchain block 231, blockchain appliance stores archival TTS blockchain block 231 on tape-tier storage 20. Archival TTS blockchain block 231 is formed to include blockchain blocks 211-216, along with D-Blocks 221D, 222D, and 223D, and T-Block 231T. Once archival TTS blockchain block 231 is written to the tape-tier storage 20, archival DTS blockchain blocks 221, 222, and 223 are deleted from disk-tier storage 18 to make room for new blockchain data. Blockchain appliance 12 then updates the data pointers in ledger 34 to reflect the new storage location of blockchain blocks within archival TTS blockchain block 231 stored on tape-tier storage 20. In this manner, blockchain blocks are created from data stream 10 and are migrated through a multi-tier storage system based upon the age and usage of the blockchain blocks to effectively manage the available storage within multi-tiered storage system 16, 18, and 20. The selection criteria for selecting blockchain blocks for migration between the cache-tier storage level 16 and disk-tier storage level 18, as well as between the disk-tier storage 18 and tape-tier storage 20 include algorithms such as a Least-Recently-Used (LRU) access threshold, a Time-Aware Least-Recently Used (TALRU) access threshold, an Adaptive Replacement Cache (ARC) access threshold, a Least-Frequently-Used (LFU) access threshold, a First-In First-Out (FIFO) access threshold, and an age threshold. The TALRU is a variant of LRU designed for the situation where the stored contents in cache have a valid lifetime. The TALRU algorithm is suitable in network cache applications, such as Information-centric networking (ICN), Content Delivery Networks (CDNs) and distributed networks in general. The blockchain may have component blocks stored on every level of the multi-tiered storage at any given time.

FIG. 11B depicts a table describing the information contained within each of the blockchain blocks 211C, 212C, 213C, 214C, 215C, 216C associated with data objects 211B, 212B, 213B, 214B, 215B, and 216B within the cache storage tier 16. The table in FIG. 11B includes the C-Block ID in column 240 and a listing of the contents of the C-Block and data pointer within column 241. Blockchain block 211 is formed of data object 211B and C-Block 211C. C-Block 211C includes a blockchain hash digest of data object 211B as calculated by hash core 404. In this case, blockchain block 211 is the genesis block, meaning it is the first blockchain block within blockchain 88. The data pointer to blockchain block 211, which is the grouping of data object 211B and C-Block 211C, is generated by blockchain appliance 12 and is stored in ledger 34 and in table 100. Blockchain block 212 is formed of data object 212B and C-Block 212C. C-Block 212C includes a blockchain hash digest of data object 212B and blockchain block 211 as calculated by hash core 404. The data pointer to blockchain block 212, which is the grouping of data object 212B and C-Block 212C, is generated by blockchain appliance 12 and is stored in ledger 34. Blockchain block 213 is formed of data object 213B and C-Block 213C. C-Block 213C includes a blockchain hash digest of data object 213B and blockchain block 212 as calculated by hash core 404. The data pointer to blockchain block 213, which is the grouping of data object 213B and C-Block 213C, is generated by blockchain appliance 12 and is stored in ledger 34. Blockchain block 214 is formed of data object 214B and C-Block 214C. C-Block 214C includes a blockchain hash digest of data object 214B blockchain block 213 as calculated by hash core 404. The data pointer to blockchain block 214, which is the grouping of data object 214B and C-Block 214C, is generated by blockchain appliance 12 and is stored in ledger 34. Blockchain block 215 is formed of data object 215B and C-Block 215C. C-Block 215C includes a blockchain hash digest of data object 215B and blockchain block 214 as calculated by hash core 404. The data pointer to blockchain block 215, which is the grouping of data object 215B and C-Block 215C, is generated by blockchain appliance 12 and is stored in ledger 34. Blockchain block 216 is formed of data object 216B and C-Block 216C. C-Block 216C includes a blockchain hash digest of data object 216B and blockchain block 215 as calculated by hash core 404. The data pointer to blockchain block 216, which is the grouping of data object 216B and C-Block 216C, is generated by blockchain appliance 12 and is stored in ledger 34. Note that blocks 211C-216C also contain all of the information from table 100.

FIG. 11C depicts two tables describing the information contained within each of the blockchain blocks 221, 222, 223, and 231 associated with data objects 211B-216B within the disk storage tier 18 and tape storage tier 20. The upper table describes the information contained within the D-Blocks, which are the blockchain blocks containing the blockchain hash digest information for the disk storage tier. The first column 242 includes the unique identifier of each D-Block. The second column 243 includes a listing of the contents of the D-Blocks such as the hash digest information as well as the data pointer. Archival DTS blockchain blocks 221, 222, and 223 form a blockchain within the disk-tier storage level. All of the archival TTS blockchain blocks, including block 231, that are stored on the tape-tier storage level 20 form a blockchain, which are discussed in the lower table. Blockchain block 221 includes D-Block 221D. D-Block 221D, which as blockchain block 221 is the archival DTS genesis block, includes a hash digest of grouped blockchain blocks 211 and 212 as calculated by hash core 404. Blockchain block 211 includes data object 211B and C-Block 211C. Blockchain block 212 includes data object 212B and C-Block 212C. Also included is the data pointer to archival DTS blockchain block 221 which is recorded in D-Block 221D as well as in ledger 34. Blockchain block 222 includes D-Block 222D. D-Block 222D includes a hash digest of grouped blockchain blocks 213 and 214 and block 221 as calculated by hash core 404. Blockchain block 213 includes data object 213B and C-Block 213C. Blockchain block 214 includes data object 214B and C-Block 214C. Also included is the data pointer to archival DTS blockchain block 222 which is recorded in D-Block 222D as well as in ledger 34. Blockchain block 223 includes D-Block 223D. D-Block 223D includes a hash digest of grouped blockchain blocks 215 and 216, and block 222 as calculated by hash core 404. Blockchain block 215 includes data object 215B and C-Block 215C. Blockchain block 216 includes data object 216B and C-Block 216C. Also include is the data pointer to archival DTS blockchain block 223 which is recorded in D-Block 223D as well as in ledger 34. All of the blocks 221D, 222D, and 223D include the information within table 100. With respect to the lower table, the first column 244 provides the identifier for the T-Block, in this case 231T. The second column 245 provides information on the hash digest within T-Block 231T as well as the data pointer to archival TTS blockchain block 231. T-Block 231T also includes all of the information from table 100. The blockchain hash digest in T-Block 231 is a hash of blockchain blocks 221, 222, and 223. Stated another way, blockchain hash digest in T-Block 231 is a hash of blockchain blocks 211, 212, 221D, 213, 214, 222D, 215, 216, and 223D. The data pointer to archival TTS blockchain block 231 is recorded in 231T and is also recorded in ledger 34.

Figure 11D:
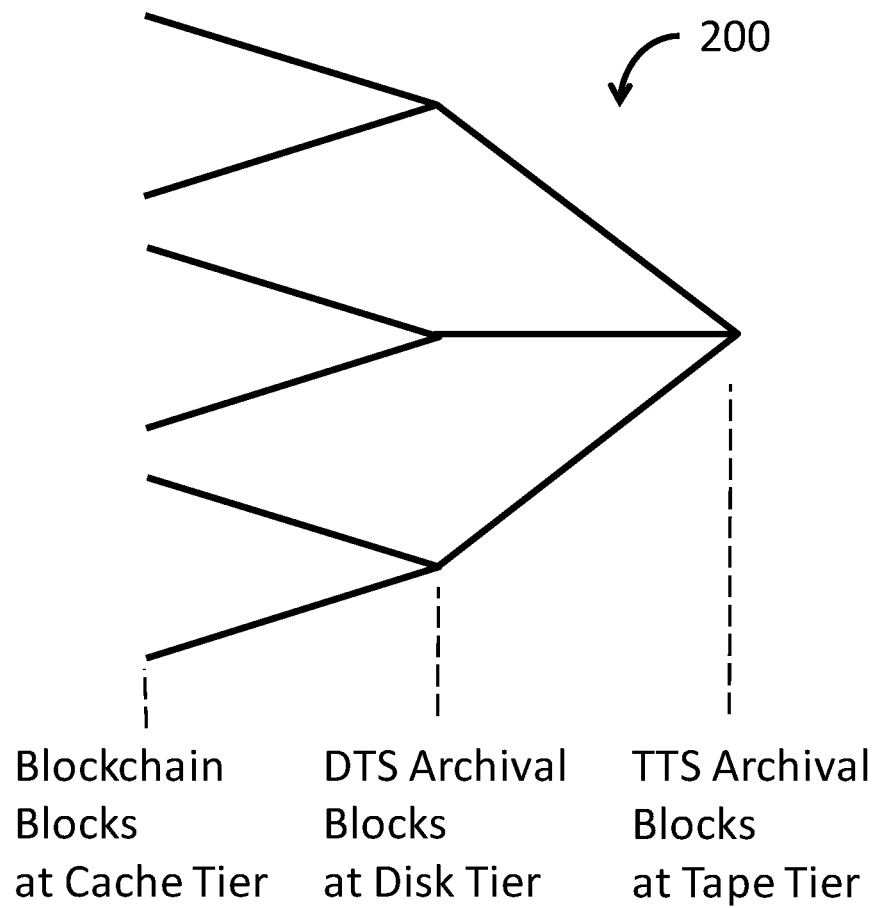

FIG. 11D illustrates how blockchains are configured into archival Merkle B-Trees 200 for data storage across a multi-tiered storage system 16, 18, and 20 that includes cache 16, disk 18, and tape storage tiers 20. Blockchain C-Blocks are formed by blockchain appliance 12 and are stored in the cache-tier 16, which form the leaf nodes of the convergent Merkle B-Tree 200 as they are the most numerous nodes of the multi-tier storage network. The most numerous blocks are the C-Blocks. The second most numerous nodes are the disk-tier storage nodes, which hold the D-Blocks, which are the second most numerous blockchain blocks. The least numerous storage nodes are the tape storage nodes which hold the least numerous blockchain blocks, the T-Blocks. As the C-Blocks are more numerous than the D-Blocks, which are more numerous than the T-Blocks, the C-Blocks, D-Blocks, and T-Blocks naturally take on the structure of a Merkle B-Tree.

Figure 11E:
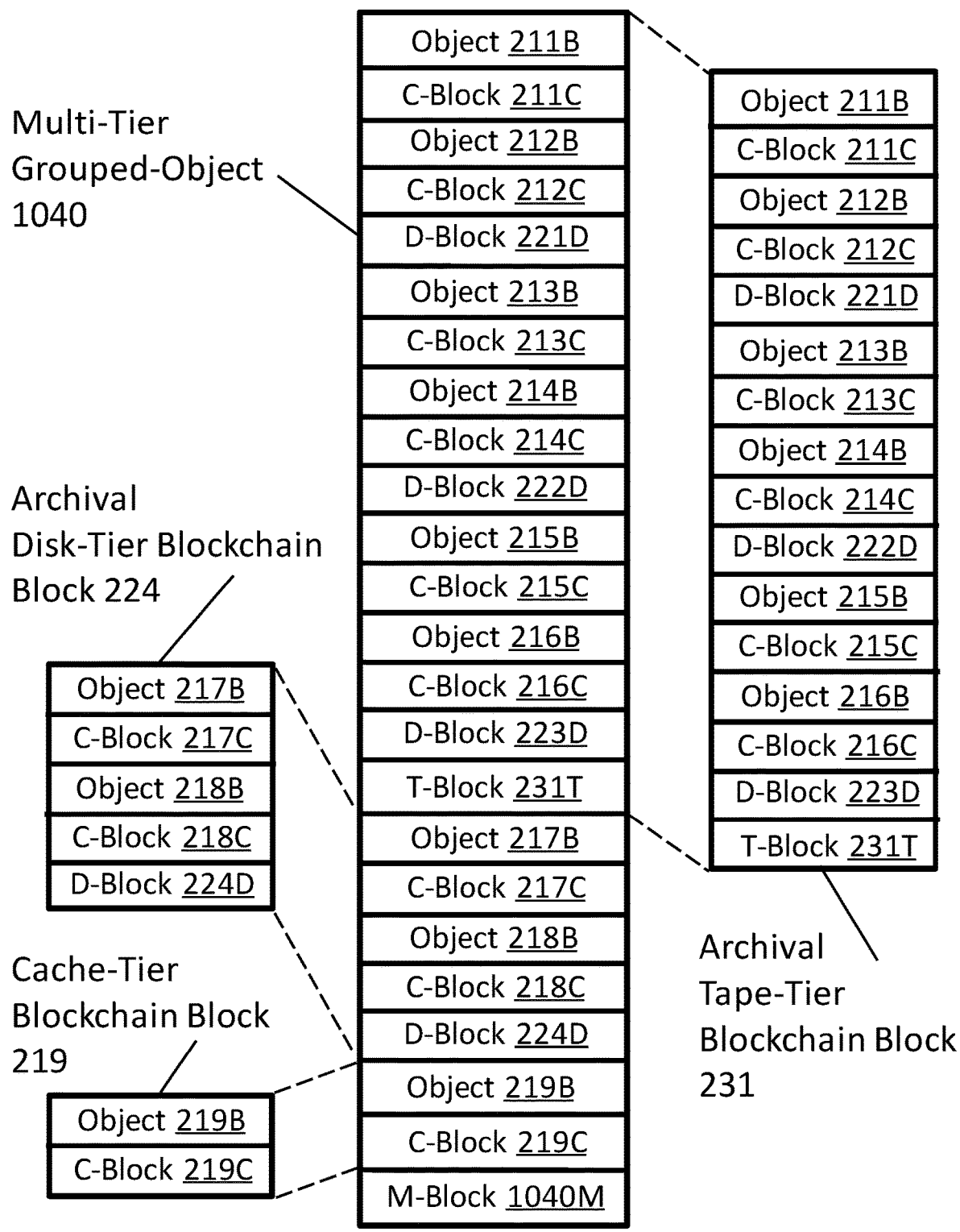

FIG. 11E illustrates a block diagram of a blockchain 88 stored across a multi-tiered storage system 16, 18, and 20 where the blockchain blocks are logically linked into a contiguous blockchain through a multi-tiered blockchain block 1040 that contains the blockchain blocks of the entire contiguous blockchain and its associated archival blockchain 1040M. Archival TTS blockchain 231 is shown at right, which is formed of the following blockchain blocks: 211B-211C-212B-212C-221D-213B-213C-214B-214C-222D-215B-215C-216B-216C-223D-231T. When blockchain appliance 12 created archival TTS blockchain block 231, blockchain appliance 12 continued to receive data stream 10 and generated new blockchain blocks 217, 218, and 219 that were stored in cache-tier 16. Per process 2000, network appliance 12 extracted data objects 217B, 218B, and 219B from data stream 10. Network appliance 12 then used hash core 404 to generate hash digests on data objects 217B, 218B, and 219B. Network appliance takes the generated hash digests on these data objects and forms C-Blocks 217C, 218C, and 219C that include the respective hash digests as well as all of the respective information listed in table 100. Together, blockchain blocks 217, 218, and 219 are formed of blocks 217B and 217C, 218B and 218C, and 219B and 219C respectively. Initially, blockchain appliance 12 stores blockchain blocks 217, 218, and 219 in cache storage tier 16 when they are created. With time, and the creation of new blockchain blocks, blockchain appliance 12 filled cache-tier storage 16 with sufficient blockchain data to trigger the storage threshold set for it and require the migration of blockchain blocks from cache-tier storage 16 to disk-tier storage 18. In this example, blockchain blocks 211-216 had already been migrated to tape-tier storage 20 having been wrapped in archival TTS blockchain block 231 for storage in tape-tier storage 20. Blockchain blocks 217 and 218 were selected by blockchain storage appliance 12 for migration to disk-tier storage 18 as they met one of the first selection criteria for migration in process 2000, for which they were wrapped in archival DTS blockchain block 224 that includes D-Block 224D. D-Block 224D includes a hash digest of blockchain blocks 217, 218 and 223, formed by hash core 404, as well as all of the information listed in table 100. However, archival DTS blockchain block 224 has not met any of the second migration selection criteria specified in process 2000 and it remains stored in disk-tier 18. Blockchain block 219 remains stored in cache-tier storage 16 as it does not meet the first migration selection criteria in process 2000 such as age of access frequency. Blockchain blocks 211-219 form a single contiguous blockchain. This single contiguous blockchain formed by blocks 211-219 is stored across cache-tier 16, disk-tier 18, and tape-tier 20. Ledger 34 maintains a "map" to the storage location of blockchain blocks 211-219 and their associated archival DTS and TTS blockchain blocks in order to logically maintain them as a single blockchain. When there is an access request for the blockchain formed of blockchain blocks 211-219, blockchain appliance 12 needs to acquire blockchain blocks 211-219 that are stored across storage tiers 16, 18, and 20. When accessing blockchain blocks 211-219, blocks 211-216 are stored on tape-tier 20 and are wrapped in archival TTS blockchain block 231. Blockchain blocks 217 and 218 are stored on disk-tier 18 and are wrapped in archival DTS block 224. Blockchain block 219 is stored on cache-tier 219. To deliver a copy of the blockchain formed of blockchain blocks 211-219 to a client, blockchain appliance 12 will access blockchain blocks 219, 224, and 231 and wrap them in a multi-tiered blockchain block 1040 that includes M-Block 1040M. M-Block 1040 includes a hash digest of blockchain blocks 231, 224, and 219 as well as all of the information specified in table 100. Together, M-Block 1040M and blockchain blocks 231, 224, and 219 form the multi-tiered blockchain block 1040. Multi-tiered blockchain block 1040 includes all blockchain blocks 211-219 as well as archival blocks 231T, 224D, 221D, 222D, and 223D recording the archival migration of the blockchain. Multi-tiered blockchain block 1040 may then be transferred to the client by blockchain appliance 12 that includes blockchain blocks 211-219.

FIG. 11F illustrates a series of tables describing the information contained within each of the blockchain blocks 231, 224, 219, and 1040 associated with data objects 211B-219B within the cache 16, disk 18, and tape storage tiers 20 along with the multi-tiered blockchain block 1040 that logically links all of the blocks 211-219 together into a contiguous blockchain archived on a multi-tiered storage system 16, 18, and 20. Blockchain block 219 is described in the first table where column 240 provides the identity of blockchain block 219C and column 241 lists the contents of blockchain 219C. Blockchain block 219C includes a hash digest of data object 219B and blockchain block 218 as calculated by blockchain hash digest 404. The second table includes a first column 242 that describes the identity of blockchain block 224D and second column 243 that describes the contents of blockchain block 224D. Blockchain block 224D includes a blockchain hash digest of blockchain blocks 217 and 218 and archival DTS blockchain block 223 as calculated by hash core 404. Block 224D also includes a data pointer to blockchain block 224, which is formed of blockchain blocks 217, 218, and 224D. The third table provides a listing of the identity of archival tape-tier blockchain block 231T in first column 244 and a listing of the contents of blockchain block 231T in second column 245. Blockchain block 231T includes archival DTS blocks 221, 222, and 223 and block 231T as well as a data pointer to block 231. The fourth and final table provides a description of multi-tier blockchain block 1040 including a listing of the identifier for M-Block 1040M in first column 246 and the contents of M-Block 1040M in column 247. M-Block 1040M includes a hash digest of blockchain blocks 231, 224, and 219 as well as a data pointer to multi-tiered blockchain block 1040. Multi-tiered blockchain block 1040 also forms a record of the configuration of blockchain 88 when it was accessed. Successive access requests for blockchain 88 generate successive multi-tiered blockchain blocks, which form a contiguous blockchain with multi-tiered blockchain block 1040, thereby generating a blockchain record of all of the read requests for blockchain 88 including the varying storage locations of blockchain 88 across the multi-tiered storage system during the access history. Multi-tiered blockchain block 1040 is formed where there is an access request for blockchain 88, such as a read request.

Figure 12:
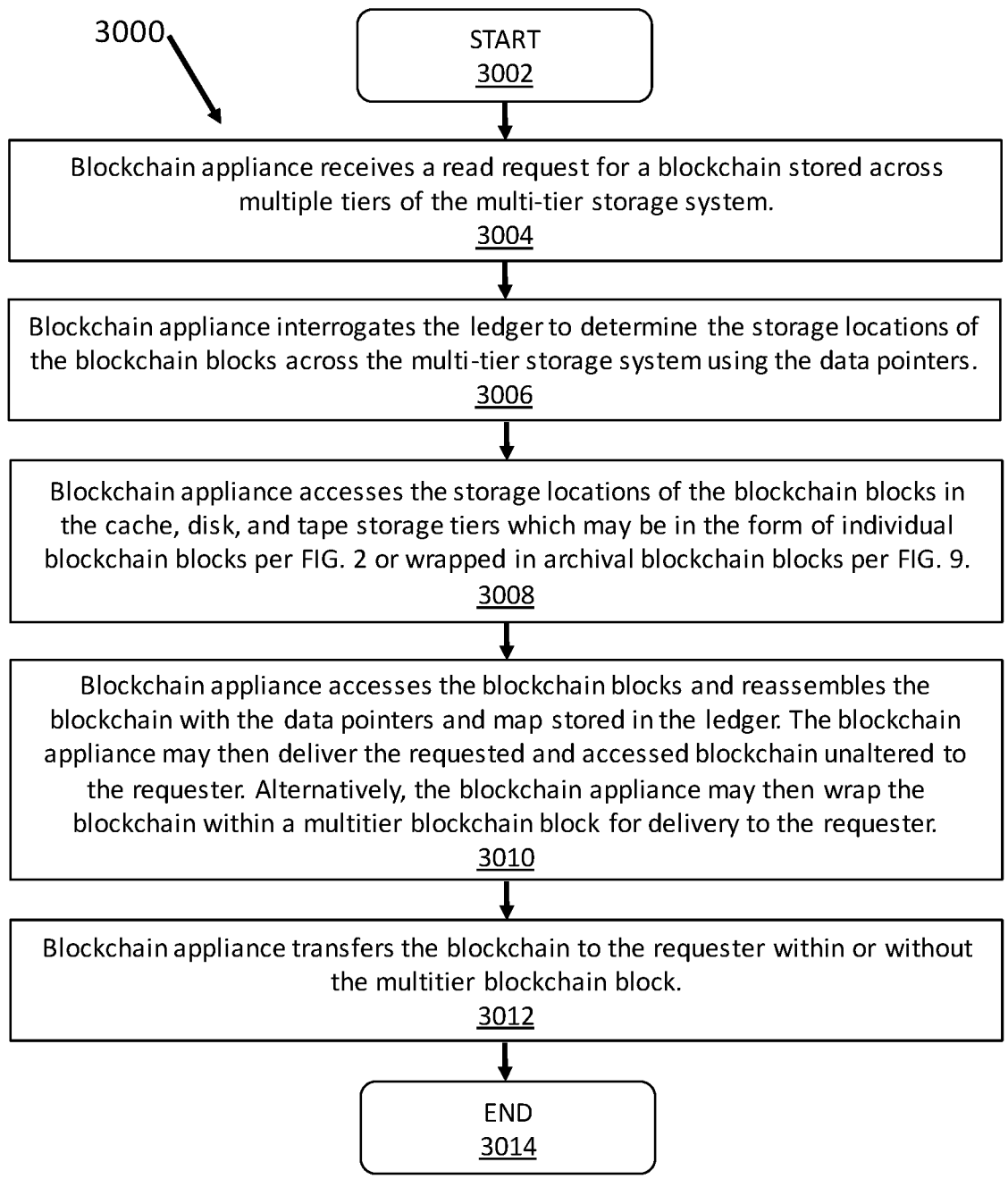
FIG. 12 illustrates a flowchart depicting a process of accessing, assembling, and transferring a blockchain stored on a multi-tier storage system with different blockchain blocks stored on different tiers.

FIG. 12 illustrates a flowchart 3000 depicting a process for accessing and transferring a contiguous blockchain where its constituent blockchain blocks are stored across different tiers of a multi-tiered storage system including cache 16, disk, 18, and tape 20. The process begins with START 3002. In step 3004, blockchain appliance 12 receives a read request for a blockchain stored across multiple tiers of the multi-tier storage system 16, 18, and 20. Then in step 3006, blockchain appliance interrogates the ledger to look up the requested blockchain by its identifier and determine the storage locations of the blockchain blocks across the multi-tier storage system using the data pointers associated with the identified blockchain. Next in step 3008, blockchain appliance 12 accesses the storage locations of the blockchain blocks in the cache 16, disk 18, and tape 20 storage tiers which may be in the form of individual blockchain blocks per FIG. 2 or wrapped within archival blockchain blocks per FIG. 9. Then in step 3010, blockchain appliance 12 accesses the blockchain blocks and reassembles the blockchain with the data pointers and map stored in the ledger 34. The blockchain appliance 12 may then deliver the requested and accessed blockchain unaltered to the requester. Alternatively, the blockchain appliance 12 may then wrap the blockchain within a multi-tier blockchain block 1040 for delivery to the requester as per FIGS. 11E and F. Wrapping the accessed blockchain in a multi-tier blockchain block involves taking a hash digest with hash core 404 of all of the accessed blockchain blocks forming the contiguous blockchain and putting the hash digest and other tabular information from table 100 in M-Block 1040M and appending M-Block 1040M to the accessed blockchain blocks and forming it into multi-tier blockchain block 1040. Then in step 3012, blockchain appliance 12 transfers the blockchain to the requester within or without the multi-tier blockchain block 1040. The process ENDS with step 3014.

Figure 13A:
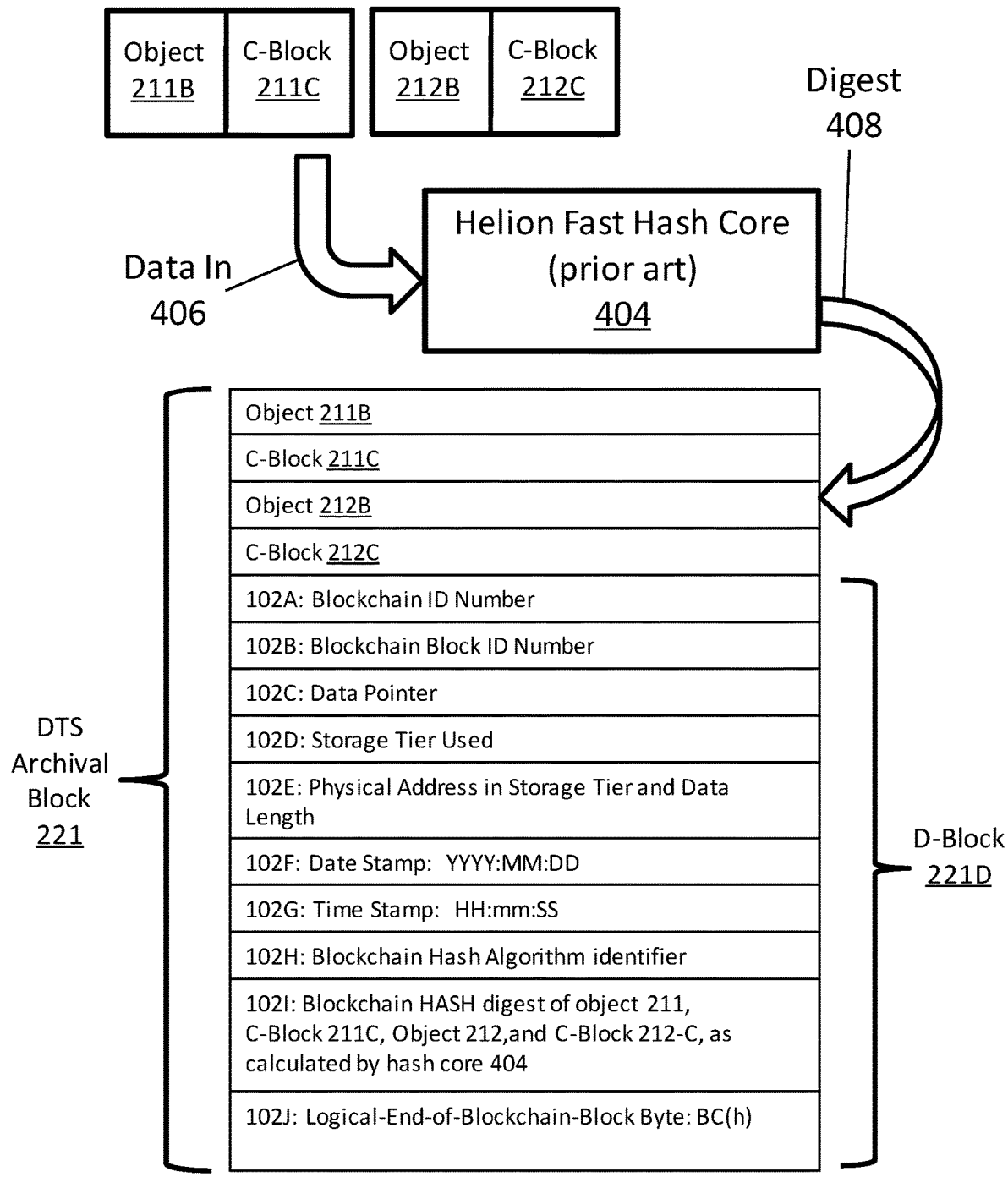
FIG. 13A illustrates how blockchain blocks from the cache storage tier level of the multi-tiered storage system are gathered and formed into an archival blockchain block for storage on the disk storage tier of the multi-tiered storage system.

FIG. 13A illustrates how blockchain blocks 211 and 212 stored on the cache storage tier level 16 of the multi-tiered storage system 16, 18 and 20 are gathered and formed into an archival blockchain block 221 for storage on the disk storage tier 18 of the multi-tiered storage system 16, 18, and 20. Blockchain appliance 12 accesses cache storage tier 16 and acquired blocks 211 and 212 for migration to the disk storage tier 18 based on first selection criteria in process 2000. Hash core 404 generates a hash digest of blocks 211 and 212 based on a hash algorithm selected by blockchain appliance 12. Blockchain appliance then builds the archival DTS blockchain block 221 by adding blockchain blocks 211, formed of blocks 211B and 211C, and 212, formed of blocks 212B and 212C, together with D-Block 221D. D-Block 221D includes all of the information from table 100. D-Block 221D includes the hash digest 408 of blocks 211 and 212, the data in 406, as calculated by hash core 404 in space 1021 and identifies the hash algorithm used in 102H. Successive blockchain blocks to 221 would include a hash of the prior archival DTS blockchain block to form a blockchain of the archival DTS blockchain blocks.

Figure 13B:
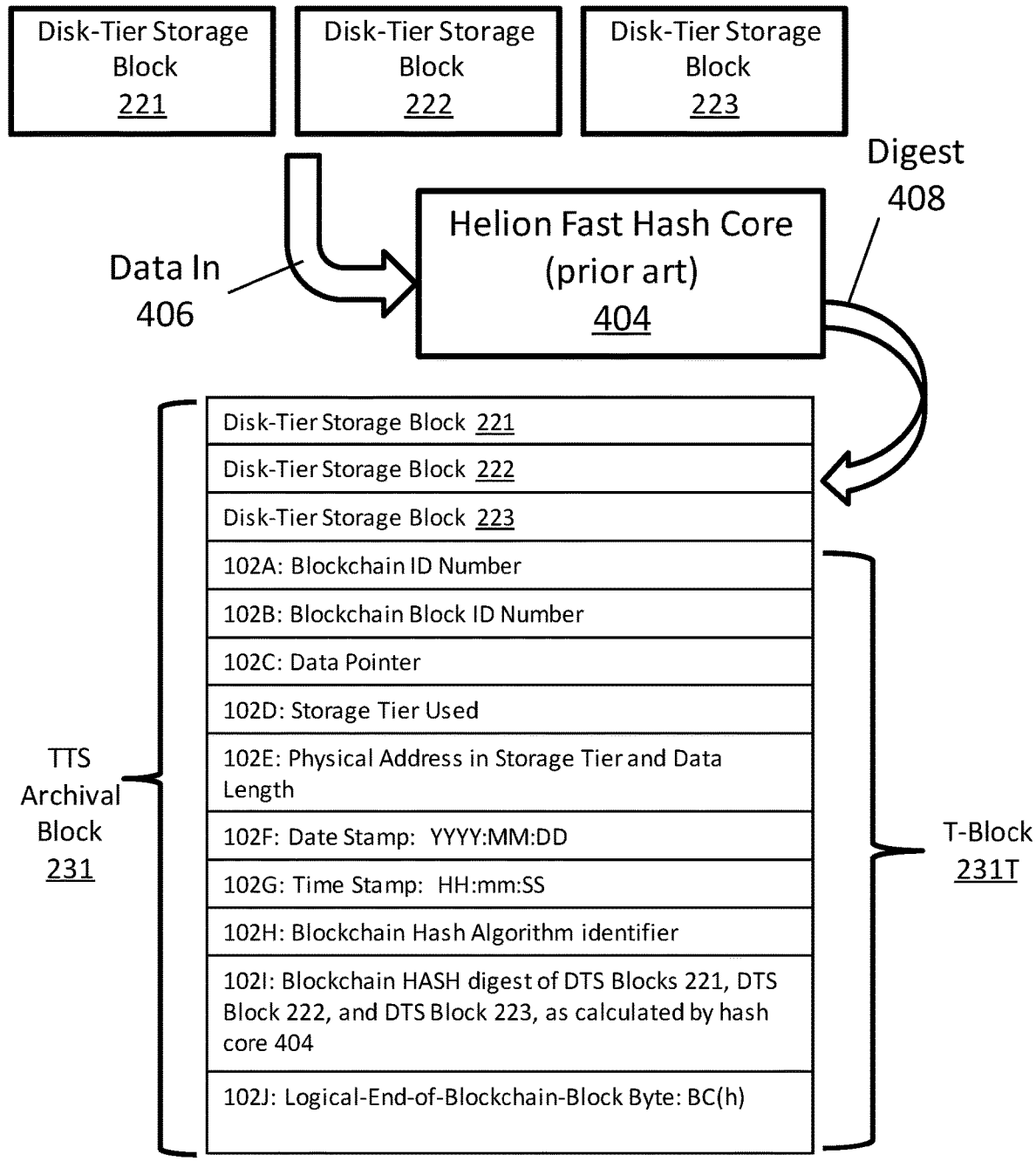
FIG. 13B illustrates how blockchain blocks from the disk storage tier level of the multi-tiered storage system are gathered and formed into an archival blockchain block for storage on the tape storage tier of the multi-tiered storage system.

FIG. 13B illustrates how archival blockchain blocks 221, 222, 223 from the disk storage tier level 18 of the multi-tiered storage system 16, 18, and 20 are gathered and formed into an archival TTS blockchain block 231 for storage on the tape storage tier 20 of the multi-tiered storage system 16, 18, and 20. Per process 2000, blockchain appliance 12 determines that disk-tier 18 is filled to the storage threshold and that it must select blockchain blocks in disk storage tier 18 to migrate to the tape-tier 20 to free up space in disk-tier 18. In this example, blockchain appliance 12 selects blocks 221, 222, and 223 for migration and pushes them as input data 406 into hash core 404 to generate a hash digest 408 of archival DTS blockchain blocks 221, 222, and 223. Then, blockchain appliance 12 builds archival TTS blockchain block 231. Archival TTS blockchain block 231 includes blockchain blocks 221, 222, and 223 along with T-Block 231T. T-Block 231T includes all of the information in table 100 including hash digest 408 in section 102I and the description of the hash algorithm used to compute hash digest 408 in section 102H. Successive blockchain blocks to 231 would include a hash of the prior archival TTS blockchain block to form a blockchain of the archival TTS blockchain blocks.

Figure 13C:
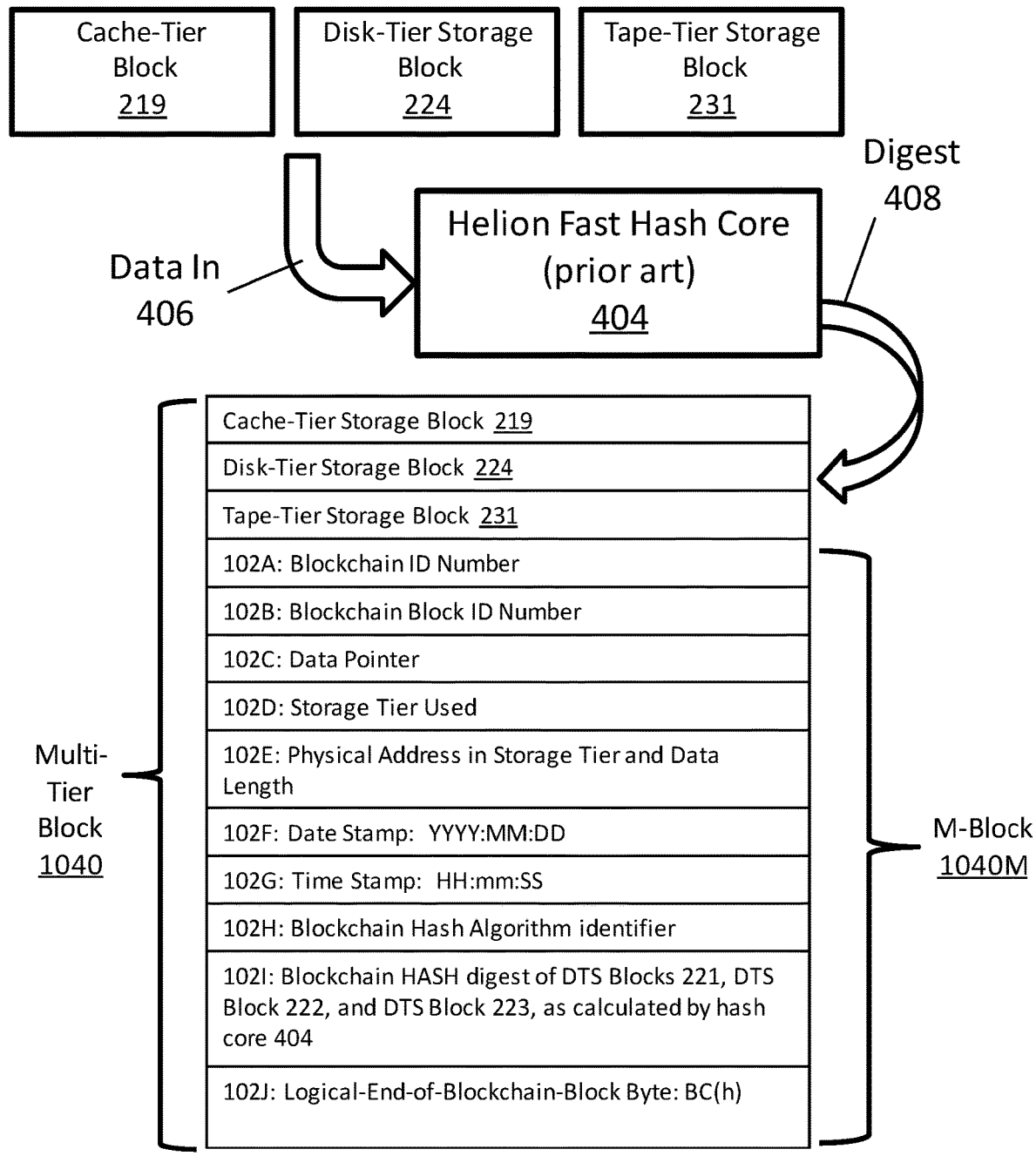
FIG. 13C illustrates how a multi-tier blockchain block is generated when the blockchain appliance accesses archival blockchain blocks from the cache, disk, and tape-tiers of the multi-tiered storage system using the ledger, hash core, and tabular information for the multi-tier blockchain block.

FIG. 13C illustrates how multi-tier blockchain block is generated when the blockchain appliance accesses archival blockchain blocks from the cache, disk, and tape-tiers of the multi-tiered storage system 16, 18, and 20 using the ledger 34, hash core 404, and tabular information 100 for the multi-tier blockchain block 1040. Per process 3000, when blockchain appliance receives a request to deliver a copy of a contiguous blockchain to a client that is stored across multiple tiers 16, 18, and 20 of a multi-tier storage system, blockchain appliance will access ledger 34 to gain the data pointers to locate and access the blockchain blocks forming the contiguous blockchain from cache 16, disk 18, and tape 20. In this case, the contiguous blockchain illustrated in FIGS. 11E and F is formed of blockchain blocks 211-219 that are stored in the multi-tier storage system as follows: cache-tier blockchain block 219, archival DTS block 224, and archival TTS block 231. Per process 3000, blockchain appliance 12 take blocks 219, 224, and 231 as data into hash core 404 to produce hash digest 408 that is included in M-Block 1040M in section 102I. The identify of the hash algorithm used to generate hash digest 408 is placed in M-Block 1040M in place 102H. M-Block 1040M includes the remainder of the information from table 100 as well. M-Block 1040M is appended to blocks 219, 224, and 231 to form multi-tier blockchain block 1040, which may then be transmitted to the client requesting the blockchain formed of blocks 211-219.

Figure 14:
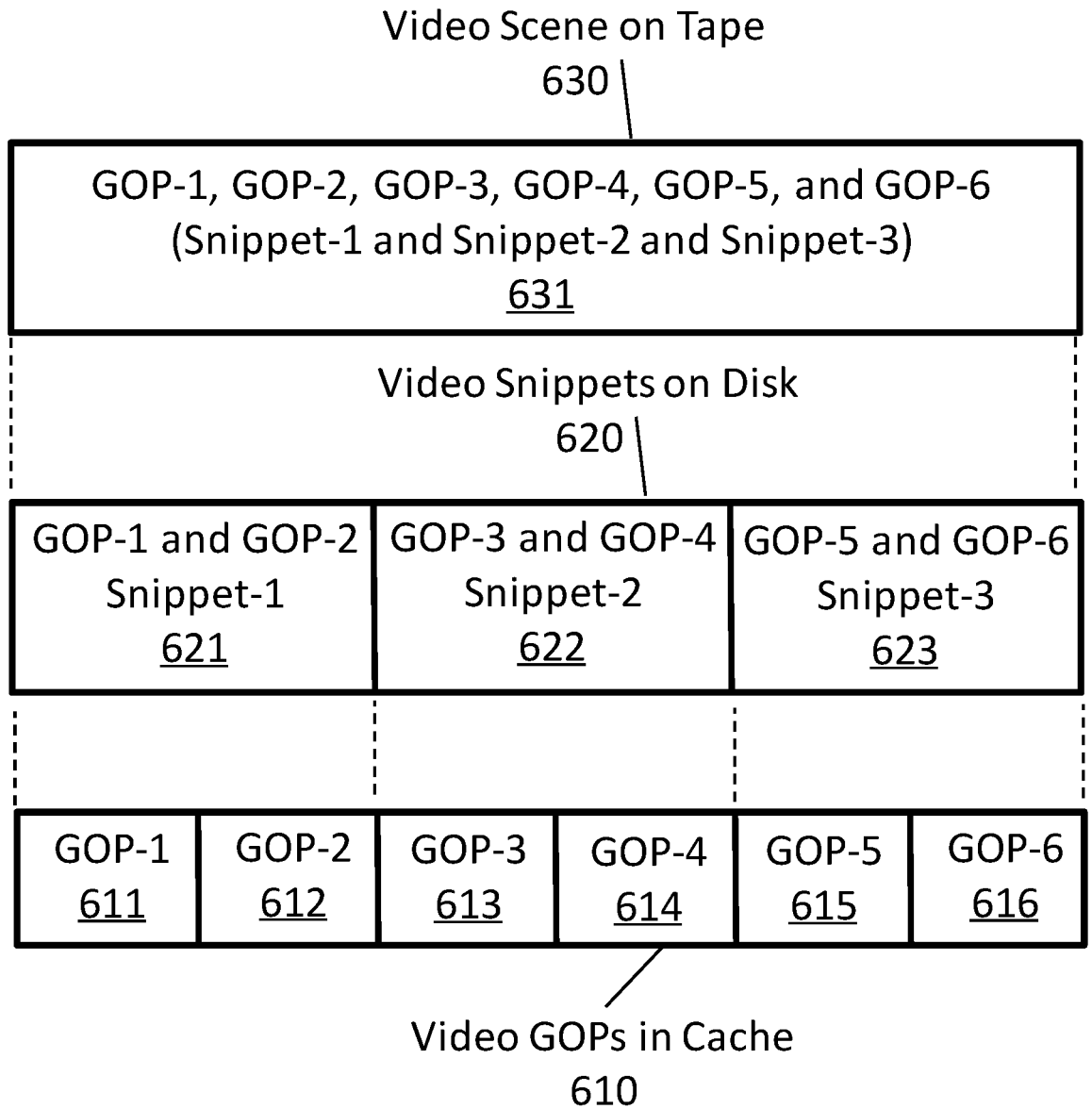
FIG. 14 illustrates a video stream as an incoming video stream and how it is blockchained and stored across a multi-tiered storage system.

FIG. 14 illustrates a video stream 10 as an incoming video stream 10 and how it is blockchained and stored across a multi-tiered storage system 16, 18, and 20. Video stream 10 is formed of a series of Groups Of Pictures (GOPs) 610. GOP-1 611, GOP-2 612, GOP-3 613, GOP-4 614, GOP-5 615, and GOP-6 616 are all Groups of Pictures that are a part of video data stream 10 that is being received by blockchain appliance 12. Blockchain appliance 12 receives GOPs 1-6 611-616 and forms them into data objects like object 211B. Blockchain appliance 12 receives video data stream 10 and takes GOPs 611-616 from that data stream 10 as data objects and generates blockchain blocks from them and stores them in cache-tier 16. With time per process 1000 or 2000, blockchain appliance 12 will fill up cache-tier 16 with blockchained GOPs 611-616 and will have to migrate them to a higher storage tier, disk-tier 18. GOPs 611-616 are all of the GOPs 610 stored in cache. Migration process 1000 or 2000 causes blockchain appliance 12 to group GOPs 611-616 into snippets, i.e. longer scenes of video. Here, snippet 621 is formed of GOPs 611 and 612. Snippet 622 is formed of GOPs 613 and 614. Snippet 623 is formed of GOPs 615 and 616. Blockchain appliance 12 would then store snippets 621, 622, and 623 on the disk-tier 18, which together are the video snippets 620 stored on disk-tier 18. Per process 1000 or 2000, blockchain appliance 12 will group and move snippets 620 to tape-tier 20 when disk-tier 18 is filled to a preset threshold level. Here, snippets 620 are formed into scene 630 stored on tape-tier 20 as scene 631. In this manner, a video stream 10 formed of a series of Groups of Pictures can be read by blockchain appliance 12 and broken down into individual blockchain blocks for storage initially in cache 16 and moved to more archival disk and tape-tiers 18 and 20 depending upon the age and usage of the GOP blockchain blocks.

Figure 15:
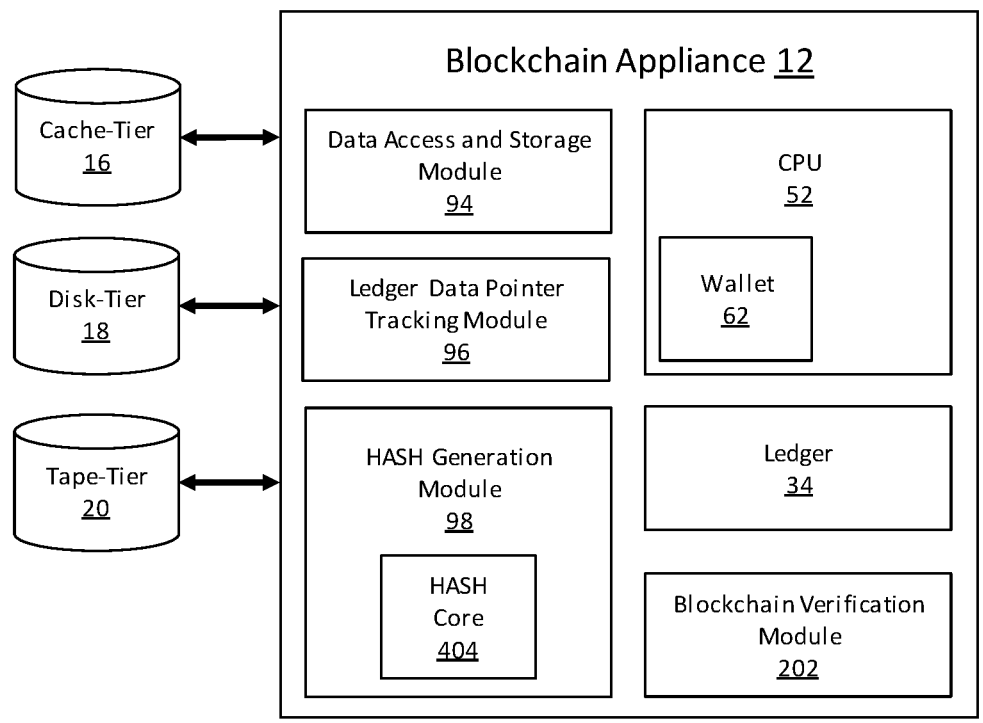
FIG. 15 illustrates a block diagram of a Blockchain Appliance 12 in communication with a cache storage tier, a disk storage tier, and a tape storage tier.

FIG. 15 illustrates a block diagram of a Blockchain Appliance 12 in communication with a cache storage tier 16, a disk storage tier 18, and a tape storage tier 20. Blockchain appliance 12 includes a data access and storage module 94, a ledger data pointer tracking module 96, a hash generation module 98 that includes hash core 404, ledger 34, and blockchain verification module 202, and CPU 52 that has wallet 62. Data access and storage module 94 supports CPU 52 with interacting with data stream 10 and reading/writing blockchain data to cache 16, disk 18, and tape 20 via network UI 54, cache UI 56, disk UI 58, and tape UI 60 per processes 1000, 2000, and 3000. Ledger data pointer tracking module 96 allows blockchain appliance 12 to monitor and track the data location of all blockchain blocks as they are generated and migrated throughout multi-tier storage system 16, 18, and 20 with or without archival storage blocks per processes 1000, 2000, and 3000. Hash generation module 98 that includes hash core 404 controls the access of data into hash core 404 from data stream 10 to generate new blockchain blocks, generate archival DTS 90 or TTS 92 blockchain blocks per FIGS. 13A and B, or generate multi-tier blockchain block 1040 per FIG. 13C. Blockchain verification module 202 allows blockchain appliance 12 to access and verify the integrity of generated blockchain blocks by polling other nodes of a distributed network to determine if there is consensus on whether the particular blockchain block is valid or not. Wallet 62 contains credentials and encryption keys for blockchain appliance 12 to interact and operate with multi-tier storage system 16, 18, and 20.

While the invention has been shown and described with reference to a particular embodiment thereof, it will be understood to those skilled in the art, that various changes in form and details may be made therein without departing from the spirit and scope of the invention.

The invention claimed is:

1. A method for archiving blockchain blocks within a multi-tiered storage system, comprising:
    migrating one or more blockchain blocks from a blockchain on a cache storage tier to a disk storage tier based on first aging criteria by generating a first archival blockchain on the disk storage tier whose constituent archival blockchain blocks contain the migrating blockchain blocks as data; and
    migrating one or more archival blockchain blocks from the disk storage tier to a tape storage tier based on second aging criteria by generating a second archival blockchain on the tape storage tier whose constituent archival blockchain blocks contain the migrating archival blockchain blocks as data.

2. The method for archiving blockchain blocks within a multi-tiered storage system of claim 1, wherein archival blockchain blocks on the tape storage tier have a data structure of a merkle tree with the blockchain blocks from the cache storage tier being leaf nodes, the archival blockchain blocks from the disk storage tier being mid-level nodes, and the archival blockchain blocks on the tape storage tier being root nodes.

3. The method for archiving blockchain blocks within a multi-tiered storage system of claim 1, wherein an instance of migrating one or more blockchain blocks from the cache storage tier to the disk storage tier generates an individual archival blockchain block for the first archival blockchain on the disk storage tier, wherein an instance of migrating one or more archival blockchain blocks from the disk storage tier to the tape storage tier generates an individual archival blockchain block for the second archival blockchain on the tape storage tier.

4. The method for archiving blockchain blocks within a multi-tiered storage system of claim 3, wherein multiple instances of migrating blockchain blocks from the cache storage tier to the disk storage tier generate multiple archival blockchain blocks forming the first archival blockchain, wherein multiple instances of migrating archival blockchain blocks from the disk storage tier to the tape storage tier generate multiple archival blockchain blocks forming the second archival blockchain.

5. The method for archiving blockchain blocks within a multi-tiered storage system of claim 1, wherein the first and second aging criteria are selected from the group consisting of a Least-Recently-Used (LRU) access threshold, a Time-Aware Least-Recently Used (TALRU) access threshold, an Adaptive Replacement Cache (ARC) access threshold, a Least-Frequently-Used (LFU) access threshold, a First-In First-Out (FIFO) access threshold, and an age threshold.

6. The method for archiving blockchain blocks within a multi-tiered storage system of claim 1, further comprising continuing to add new blockchain blocks to the blockchain on the cache tier.

7. The method for archiving blockchain blocks within a multi-tiered storage system of claim 1, further comprising a blockchain appliance having a processor that applies the aging criteria to the blockchain blocks on the cache storage tier and the archival blockchain blocks on the disk storage tier for migration and correspondingly generates the archival blockchain blocks.

8. The method for archiving blockchain blocks within a multi-tiered storage system of claim 1, wherein the blockchain appliance updates data pointers to the blockchain blocks as they are migrated to the disk storage tier and the tape storage tier and stores them in a ledger to link the blockchain blocks across the cache storage tier, disk storage tier, and tape storage tier together into a contiguous blockchain.

9. A method for archiving blockchain blocks within a multi-tiered storage system, comprising:
migrating one or more blockchain blocks from a blockchain on a cache storage tier to a disk storage tier based on a first aging criteria by storing them within an archival blockchain on the disk storage tier;
migrating one or more archival blockchain blocks from the archival blockchain on the disk storage tier to a tape storage tier based on a second aging criteria by storing them within an archival blockchain on the tape storage tier; and
continuing to add new blockchain blocks to the blockchain on the cache tier.

10. The method for archiving blockchain blocks within a multi-tiered storage system of claim 9, wherein an instance of migrating blockchain blocks from the cache storage tier to the disk storage tier generates an individual archival blockchain block within the archival blockchain on the disk storage tier, wherein an instance of migrating archival blockchain blocks from the disk storage tier to the tape storage tier generates an individual archival blockchain block within the archival blockchain on the tape storage tier.

11. The method for archiving blockchain blocks within a multi-tiered storage system of claim 9, wherein multiple instances of migrating blockchain blocks from the cache storage tier to the disk storage tier generate multiple archival blockchain blocks forming the archival blockchain on the disk storage tier, wherein multiple instances of migrating archival blockchain blocks from the disk storage tier to the tape storage tier generates multiple archival blockchain blocks that form the archival blockchain on the tape storage tier.

12. The method for archiving blockchain blocks within a multi-tiered storage system of claim 9, wherein archival blockchain blocks on the tape storage tier have merkle tree data structures with the cache storage tier blockchain blocks being leaf nodes, the disk storage tier archival blockchain blocks being mid-level nodes, and the tape storage tier archival blockchain block being a root node.

13. The method for archiving blockchain blocks within a multi-tiered storage system of claim 9, wherein the aging criteria is selected from the group consisting of a Least-Recently-Used (LRU) access threshold, a Time-Aware Least-Recently Used (TALRU) access threshold, an Adaptive Replacement Cache (ARC) access threshold, a Least-Frequently-Used (LFU) access threshold, a First-In First-Out (FIFO) access threshold, and an age threshold.

14. The method for archiving blockchain blocks within a multi-tiered storage system of claim 13, wherein the first aging criteria for migrating blockchain blocks from the cache storage tier to the disk storage tier is different from the second aging criteria for migrating archival blockchain blocks from the disk storage tier to the tape storage tier, or wherein the first aging criteria for migrating blockchain blocks from the cache storage tier to the disk storage tier is the same as the second aging criteria for migrating archival blockchain blocks from the disk storage tier to the tape storage tier.

15. The method for archiving blockchain blocks within a multi-tiered storage system of claim 9, further comprising a blockchain appliance having a processor that applies the aging criteria to the blockchain blocks on the cache storage tier and the archival blockchain blocks on the disk storage tier for migration and correspondingly generates the archival blockchain blocks, wherein the blockchain appliance updates data pointers to the blockchain blocks as they are migrated to the disk storage tier and the tape storage tier and stores them in a ledger to link the blockchain blocks across the cache storage tier, disk storage tier, and tape storage tier together into a contiguous blockchain.

16. A method for archiving blockchain blocks within a multi-tiered storage system, comprising:
archiving blockchains based on aging criteria within merkle trees, wherein new blockchain blocks are stored within merkle tree leaf nodes on a cache storage tier, wherein blockchain blocks within the cache storage tier that meet a first aging criteria are migrated to a disk storage tier and are stored within merkle tree mid-level nodes, wherein blockchain blocks within the disk storage tier that meet a second aging criteria are migrated to a tape storage tier and are stored within a merkle tree root nodes, wherein the mid-level nodes form a first archival blockchain, wherein the root nodes forms a second archival blockchain.

17. The method for archiving blockchain blocks within a multi-tiered storage system of claim 16, wherein the first and second aging criteria are selected from the group consisting of a Least-Recently-Used (LRU) access threshold, a Time-Aware Least-Recently Used (TALRU) access threshold, an Adaptive Replacement Cache (ARC) access threshold, a Least-Frequently-Used (LFU) access threshold, a First-In First-Out (FIFO) access threshold, and an age threshold, wherein the first and second aging criteria are the same, or they are different.

18. The method for archiving blockchain blocks within a multi-tiered storage system of claim 17, wherein an instance of migrating blockchain blocks from the cache storage tier to the disk storage tier generates an individual archival blockchain block forming a part of the first archival blockchain, wherein an instance of migrating blockchain blocks from the disk storage tier to the tape storage tier generates an individual archival blockchain block forming a part of the second archival blockchain.

19. The method for archiving blockchain blocks within a multi-tiered storage system of claim 18, wherein the blockchain blocks migrated from the disk storage tier to the tape storage tier are archival blockchain blocks that are from the first archival blockchain.

20. The method for archiving blockchain blocks within a multi-tiered storage system of claim 19, further comprising a blockchain appliance having a processor that applies the aging criteria to the blockchain blocks on the cache storage tier and disk storage tier for migration and correspondingly generates the archival blockchain blocks, wherein the blockchain appliance updates data pointers to the blockchain blocks as they are migrated to the disk storage tier and the tape storage tier and stores them in a ledger to link the blockchain blocks across the cache storage tier, disk storage tier, and tape storage tier into a contiguous blockchain.

* * * * *